(12) United States Patent
Maeda

(10) Patent No.: US 8,363,252 B2
(45) Date of Patent: Jan. 29, 2013

(54) IMAGE FORMING DEVICE, AND ACTIVATION METHOD, ACTIVATING OR DEACTIVATING PROGRAM ON PACKAGE BASIS

(75) Inventor: Shunichi Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 889 days.

(21) Appl. No.: 12/490,426

(22) Filed: Jun. 24, 2009

(65) Prior Publication Data

US 2009/0323107 A1    Dec. 31, 2009

(30) Foreign Application Priority Data

Jun. 30, 2008 (JP) .................... 2008-171636

(51) Int. Cl.
*G06F 15/00* (2006.01)
(52) U.S. Cl. .................... 358/1.15; 358/1.1; 358/1.16
(58) Field of Classification Search ............... 358/1.1, 358/1.13, 1.14, 1.15, 400, 401, 468, 1.16
See application file for complete search history.

(56) References Cited

U.S. PATENT DOCUMENTS

| 2004/0205261 | A1 | 10/2004 | Osada |
| 2006/0200421 | A1 | 9/2006 | Harada |
| 2007/0206211 | A1* | 9/2007 | Okutsu et al. ............. 358/1.14 |
| 2008/0040392 | A1 | 2/2008 | Sugishita |
| 2008/0046720 | A1 | 2/2008 | Sugishita et al. |
| 2008/0086492 | A1 | 4/2008 | Maeda |
| 2008/0092130 | A1 | 4/2008 | Maeda |

FOREIGN PATENT DOCUMENTS

| JP | 07-110767 | 4/1995 |
| JP | 2004-213469 | 7/2004 |
| JP | 2006-279935 | 10/2006 |
| JP | 2008-041057 | 2/2008 |
| JP | 2008-079284 | 4/2008 |

OTHER PUBLICATIONS

Japanese Office Action dated Jun. 12, 2012.

* cited by examiner

*Primary Examiner* — Thomas D Lee
(74) *Attorney, Agent, or Firm* — IPUSA, PLLC

(57) ABSTRACT

An image forming device includes an information storage part which stores sales package information and function package information. A function package information updating part increments, when activation of a sales package is performed, an activation component number of each of program components of the sales package in the function package information, and sets a flag of one of the program components to an activated state when the flag of one of the program components prior to the activation indicates a deactivated state. A starting information updating part registers a component identifier of one of the program components into starting information when the flag of one of the program components is changed from the deactivated state to the activated state by the activation.

13 Claims, 44 Drawing Sheets

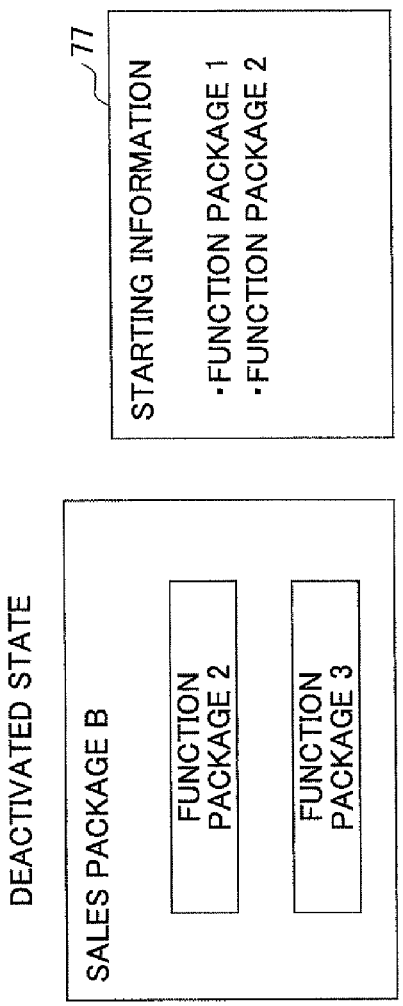
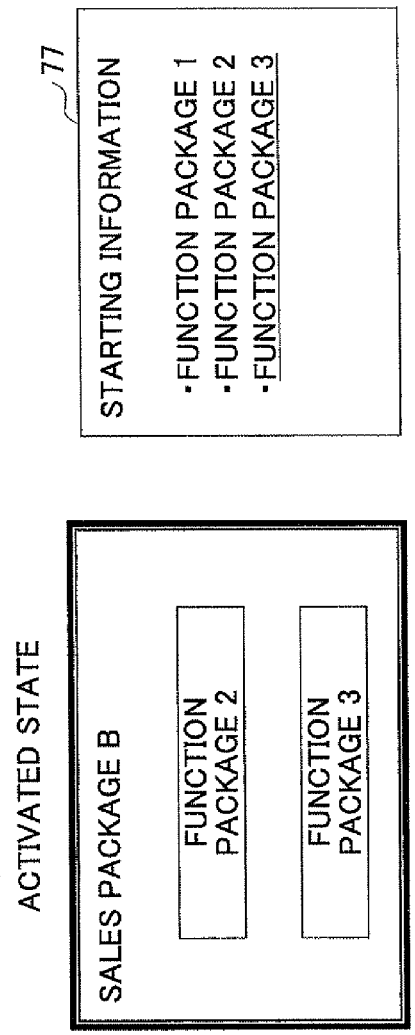
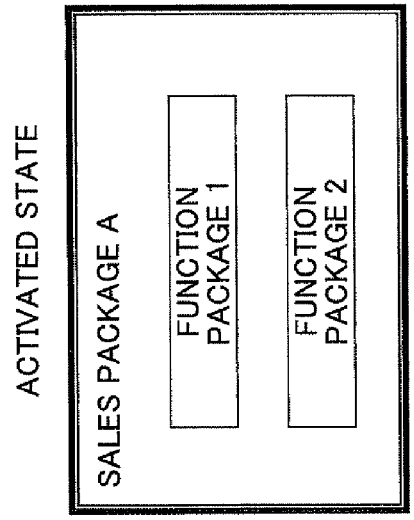
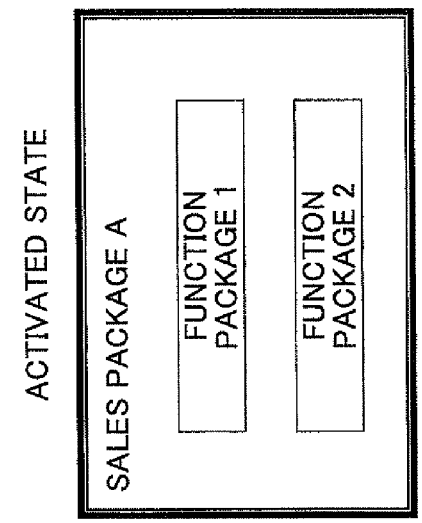

FIG.6

| LICENSE UNIQUE ID | SALES PACKAGE ID | LOCK CODE | EXPIRATION DATE | DATE OF CREATION |
|---|---|---|---|---|
| 123456 | 1111 | 123ABC | 200x 1/1 | 200x 3/1 |
| 654321 | 1222 | 456EDF | 200x 4/1 | 200x 6/30 |

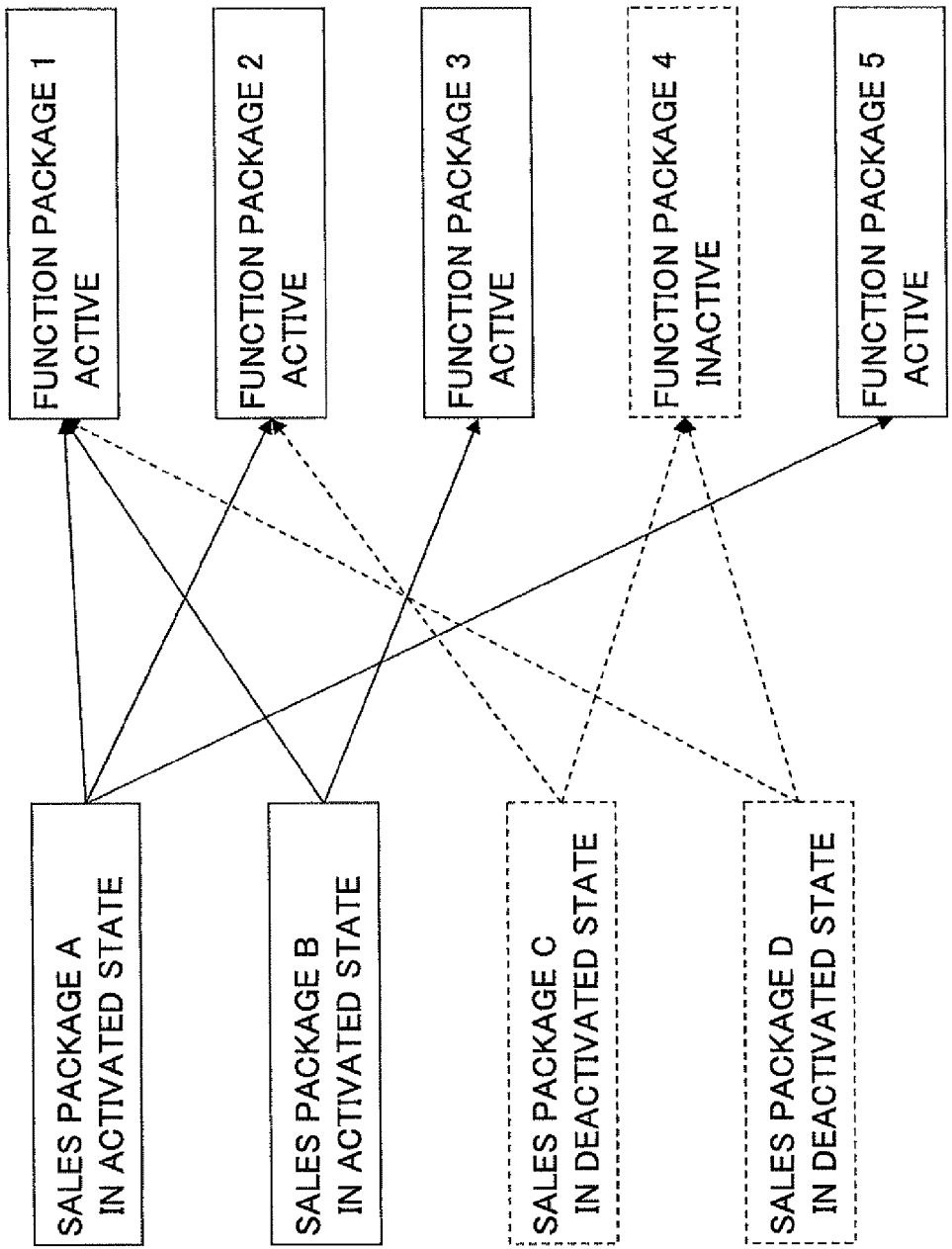

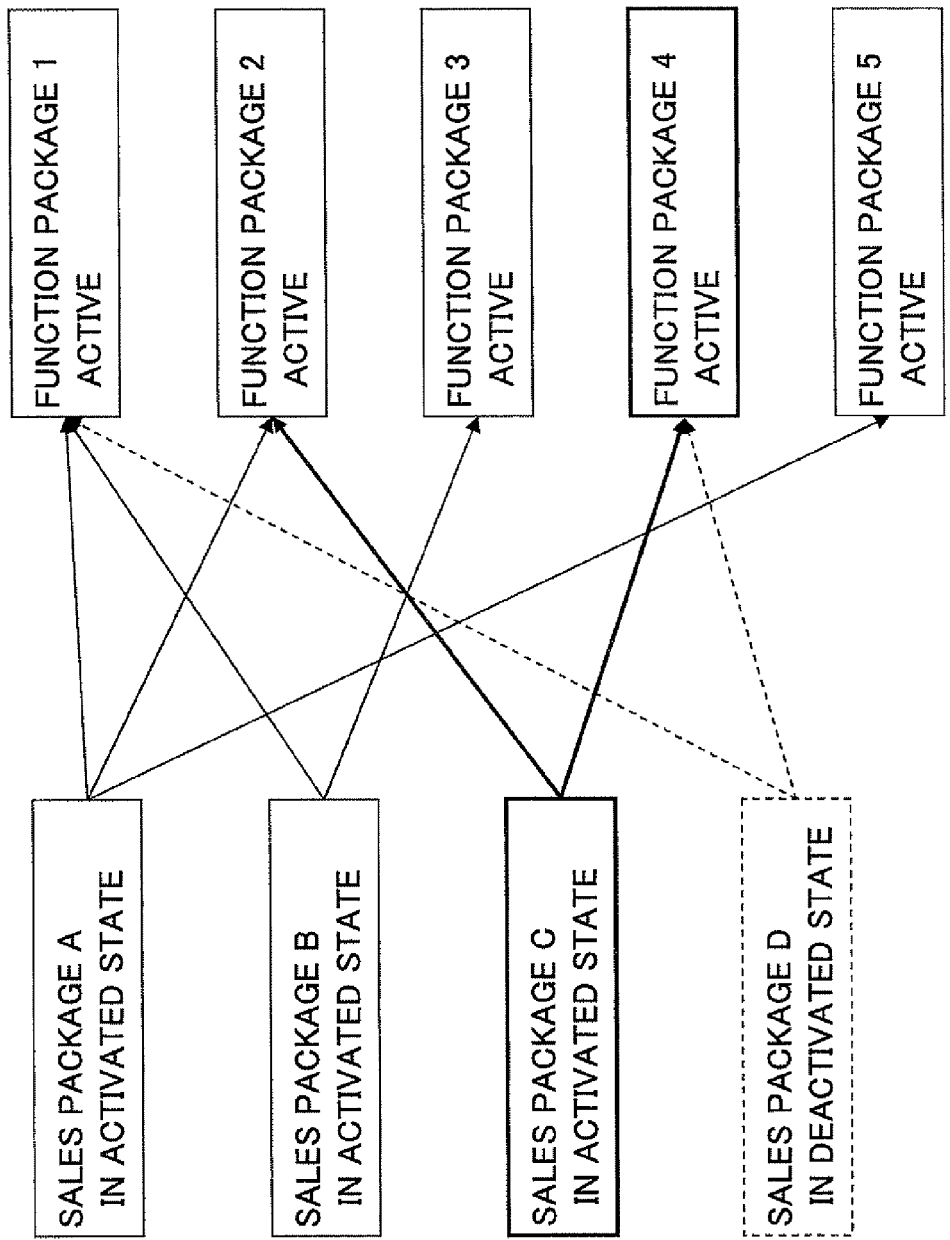

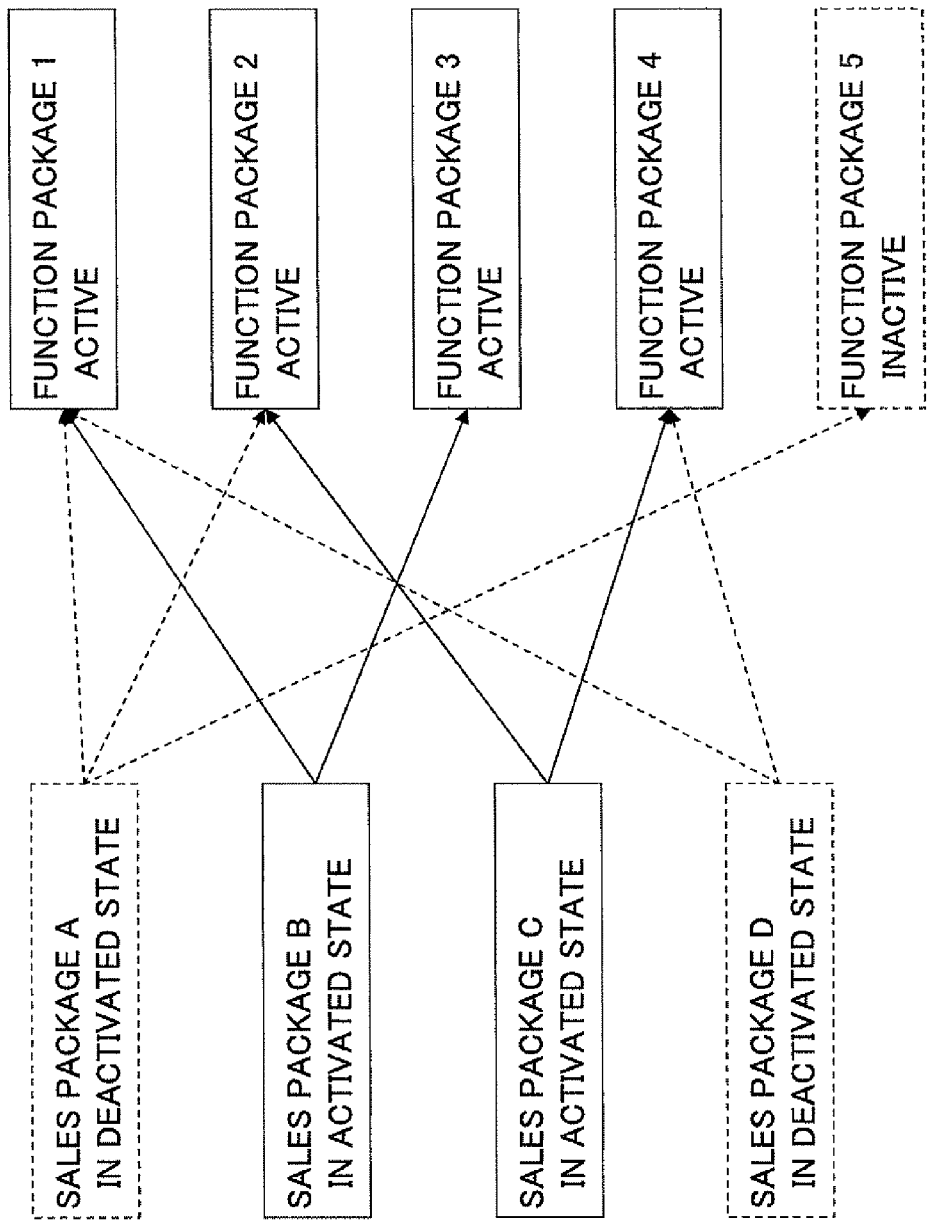

FIG.12

| NAME | SALES ID | ACTIVATION COLUMN | FUNCTION ID LIST | EXPIRATION DATE |
|---|---|---|---|---|
| dist1 | 1111 | ○ | {2111, 2222, 2333} | 3/31 |
| dist2 | 1222 | ○ | {2111, 2333} | — |
| dist3 | 1333 | ○ | {2222, 2444} | — |
| dist4 | 1444 | ○ | {2111, 2444} | — |

FIG.15A

| NAME | SALES ID | ACTIVATION COLUMN | FUNCTION ID LIST | EXPIRATION DATE |
|---|---|---|---|---|
| dist1 | 1111 | O | {2111, 2222, 2555} | 1/11 |
| dist2 | 1222 | O | {2111, 2333} | 2/22 |
| dist3 | 1333 | O | {2222, 2444} | 3/24 |
| dist4 | 1444 |   | {2111, 2444} | 4/1 |

FIG.15B

| NAME | FUNCTION ID | PURCHASE P NO. | A. PURCHASE P NO. | ACTIVATION COLUMN | EXPIRATION DATE LIST |
|---|---|---|---|---|---|
| func1 | 2111 | 3 | 3 | O | 1/11, 2/22, 4/1 |
| func2 | 2222 | 2 | 2 | O | 1/11, 3/24 |
| func3 | 2333 | 1 | 1 | O | 2/22 |
| func4 | 2444 | 2 | 2 | O | 3/2, 4/1 |
| func5 | 2555 | 1 | 1 | O | 1/11 |

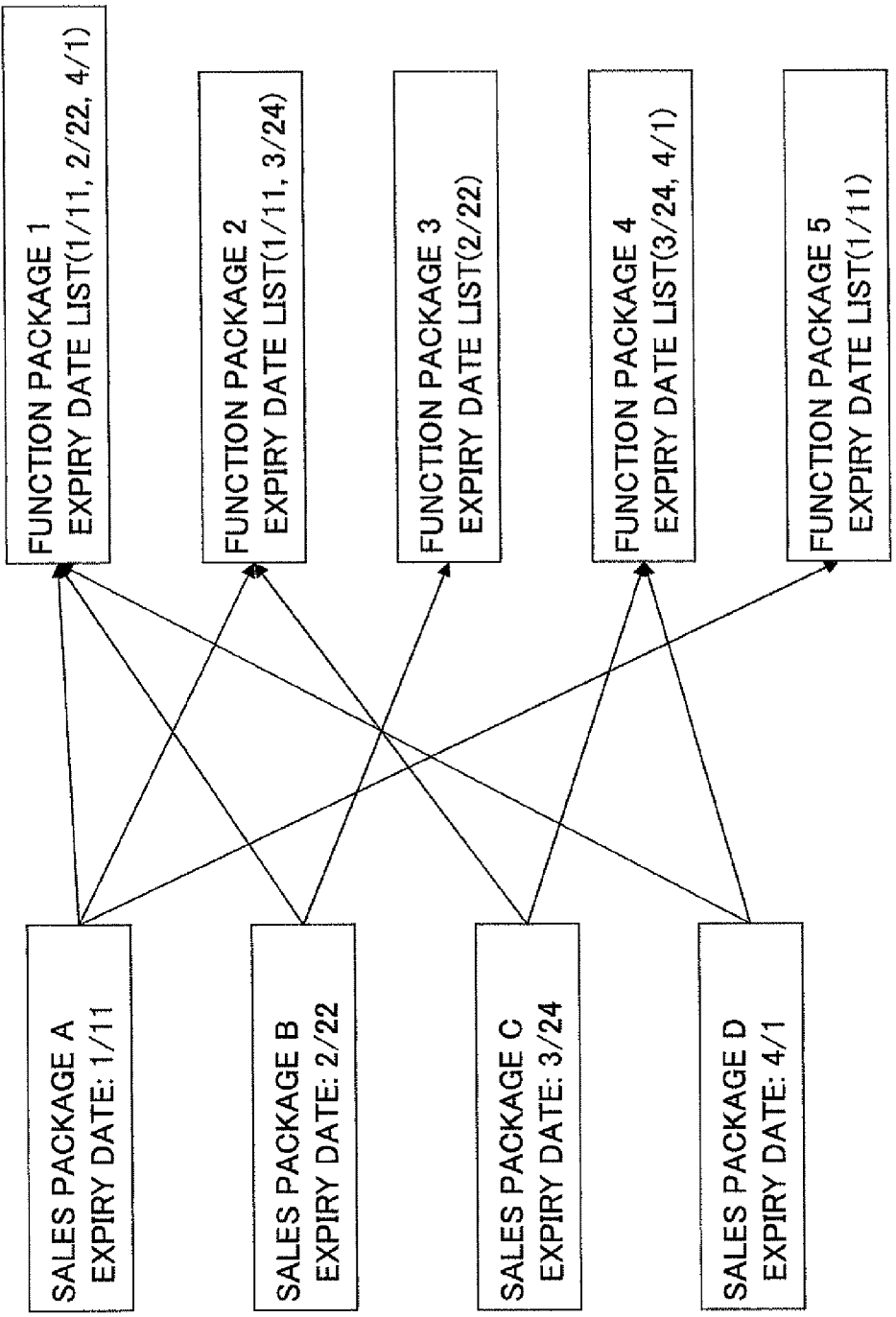

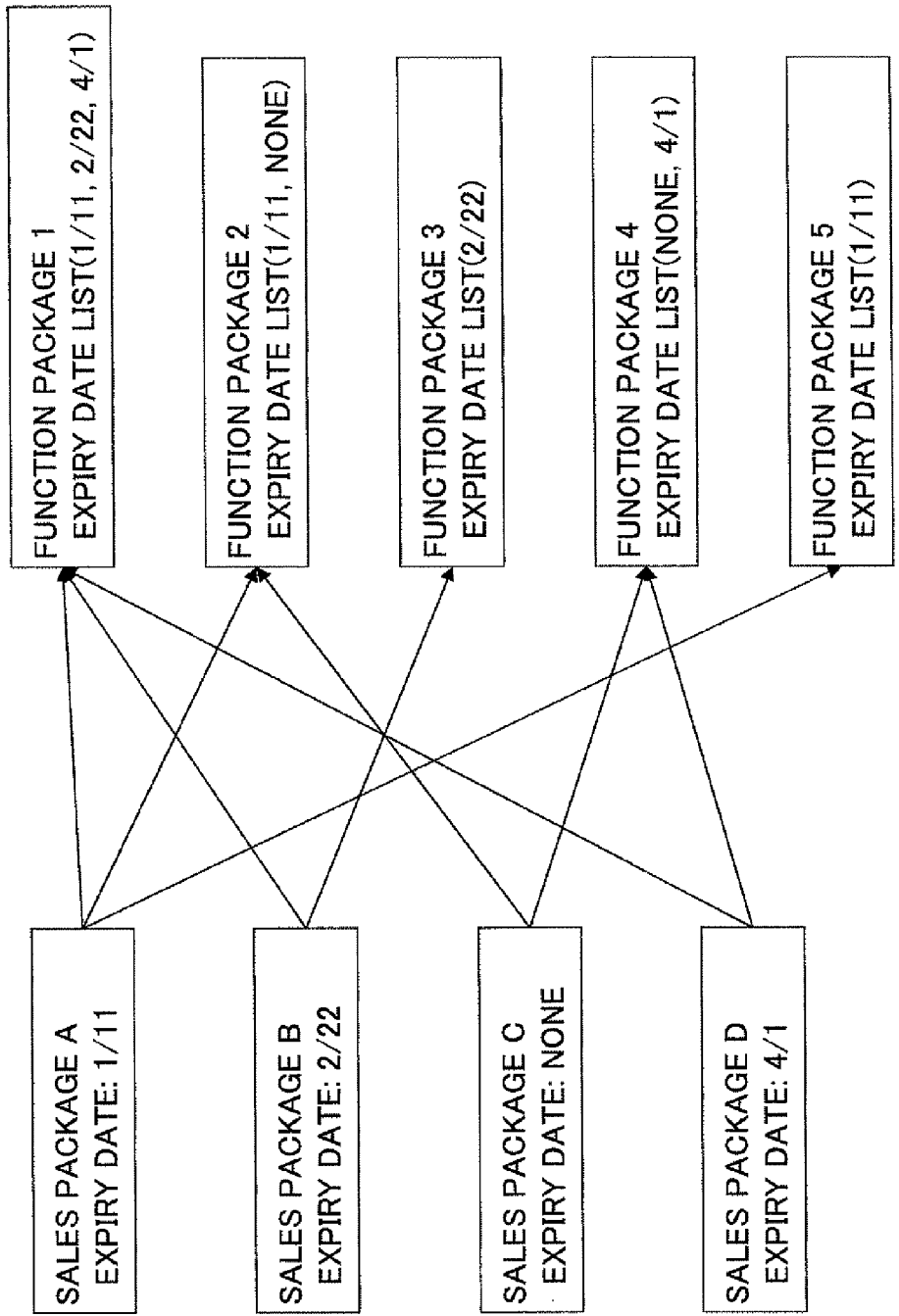

IMAGE FORMING DEVICE, AND ACTIVATION METHOD, ACTIVATING OR DEACTIVATING PROGRAM ON PACKAGE BASIS

BACKGROUND OF THE INVENTION

1. Field of the Invention

This invention relates to an image forming device which starts program components contained in a sales package, when the sales package is activated.

2. Description of the Related Art

In an information processing device which executes programs to perform various functions, the number of the functions of the information processing device can be increased or decreased according to the increase or decrease of the number of programs installed therein. Even after the information processing device is purchased, a user can use an additional desired function on the information processing device if a program which provides the desired function is purchased and installed in the information processing device.

As for some programs, activation of the programs in an information processing device must be performed at a time of installation of the programs, or after the time of the installation, in order to enable the functions provided by the programs to be effectively used on the information processing device. This activation is to perform an operation that licenses the user to use the program on the information processing device, or to generate license information that certifies the license and store the license information in a predetermined server or information processing device. Refer to Japanese Laid-Open Patent Publication No. 07-110767.

By the activation method disclosed in Japanese Laid-Open Patent Publication No. 07-110767, a program ID which identifies a program is contained in the license information and stored in the predetermined server or information processing device. If an unauthorized person attempts to install the program with the program ID in a secondary information processing device, the predetermined server or information processing device detects the program ID contained in the license information and inhibits the unauthorized person from activating the program in the secondary information processing device. Hence, the unauthorized person cannot use the function, provided by the program, on the secondary information processing device.

Therefore, if the activation method of Japanese Laid-Open Patent Publication No. 07-110767 is applied, activation of respective programs in a secondary information processing device is inhibited by the predetermined server or information processing device. Even if all the respective programs are installed beforehand in the original information processing device, it is possible to prevent each of the programs from being illegally used, regardless of whether the programs are actually purchased.

Moreover, Japanese Laid-Open Patent Publication No. 2006-279935 discloses an information processing device wherein license information of a user is stored in a removable recording medium, and when the removable recording medium is inserted in the information processing device, the user is permitted to use the information processing device. In this information processing device, the authentication information of a recording medium is further stored in the information processing device.

By the information processing device disclosed in Japanese Laid-Open Patent Publication No. 2006-279935, it is possible to prevent an unauthorized person from copying the license information or using the information processing device.

When activation of the programs installed beforehand is performed, the operation of performing activation of each of the respective programs one by one in accordance with the demanded function is troublesome.

For example, there is a method of sales in which a package containing a plurality of programs is purchased. There is a set of application programs which can be effectively used as a result of association of some of functions provided by a plurality of programs of a sales package.

In this case, the user has to perform activation of corresponding programs from among the plurality of programs of the sales package individually, and in many cases, selection of the programs to be activated from among the plurality of programs by the user becomes a difficult task.

SUMMARY OF THE INVENTION

In one aspect of the invention, the present disclosure provides an improved image forming device in which the above-described problems are eliminated.

In one aspect of the invention, the present disclosure provides an image forming device which is able to perform activation of a plurality of programs for each sales package and able to easily set up the activation or deactivation of each of the plurality of programs.

In an embodiment of the invention which solves or reduces one or more of the above-mentioned problems, the present disclosure provides an image forming device which starts one or more program components contained in a sales package and registered in starting information at a time of activation of the sales package, the image forming device including: an information storage part to store sales package information in which a first flag indicating an activated or deactivated state of a sales package, and a component identifier of each of one or more program components contained in the sales package are registered, and to store function package information in which an activation component number indicating the number of program components activated by the activation among purchased program components, and a second flag indicating an activated or deactivated state of each of the one or more program components are registered; a function package information updating part to increment, when activation of the sales package is performed, the activation component number of each of the one or more program components registered in the function package information, and to set the second flag of one of the one or more program components to an activated state when the second flag of the one of the one or more program components prior to the activation indicates a deactivated state; and a starting information updating part to register a component identifier of one of the one or more program components into the starting information when the second flag of the one of the one or more program components is changed from the deactivated state to the activated state by the activation.

In an embodiment of the invention which solves or reduces one or more of the above-mentioned problems, the present disclosure provides an activation method activation method of an image forming device which starts one or more program components contained in a sales package and registered in starting information at a time of activation of the sales package and includes an information storage part which stores sales package information in which a first flag indicating an activated or deactivated state of a sales package, and a component identifier of each of one or more program components contained in the sales package are registered, and stores function package information in which an activation component number indicating the number of program components activated by the activation among purchased program components, and a second flag indicating an activated or deactivated state of each of the one or more program components are registered, the activation method including: incrementing, by a function package information updating part of the image forming device, when activation of the sales package is performed, the activation component number of each of the one or more program components registered in the function package information, and setting the second flag of one of the one or more program components to an activated state when the second flag of the one of the one or more program components prior to the activation indicates a deactivated state; and registering, by a starting information updating part of the image forming device, a component identifier of one of the one or more program components into the starting information when the second flag of the one of the one or more program components is changed from the deactivated state to the activated state by the activation.

Other objects, features and advantages of the present invention will become more apparent from the following detailed description when read in conjunction with the accompanying drawings.

BRIEF DESCRIPTION OF THE DRAWINGS

FIG. 1A and FIG. 1B are diagrams for explaining an example of activation in an image forming device of an embodiment of the invention.

FIG. 6 is a diagram illustrating an example of a license file.

FIG. 9A and FIG. 9B are diagrams for explaining an example of activation of a sales package.

FIG. 10A and FIG. 10B are diagrams for explaining an example of activation of a sales package.

FIG. 11A and FIG. 11B are diagrams for explaining an example of deactivation of a sales package.

FIG. 12 is a diagram illustrating an example of sales package information in which an expiration date can be registered.

FIG. 15A and FIG. 15B are diagrams illustrating an example of sales package information in which an expiration date is registered.

FIG. 16A and FIG. 16B are diagrams for explaining the relationship between sales packages and function packages when a function package includes a plurality of expiration dates.

FIG. 17A and FIG. 17B are diagrams for explaining the relationship between sales packages and function packages when no expiration date is set in a sales package.

DETAILED DESCRIPTION OF THE PREFERRED EMBODIMENTS

Figure 2:
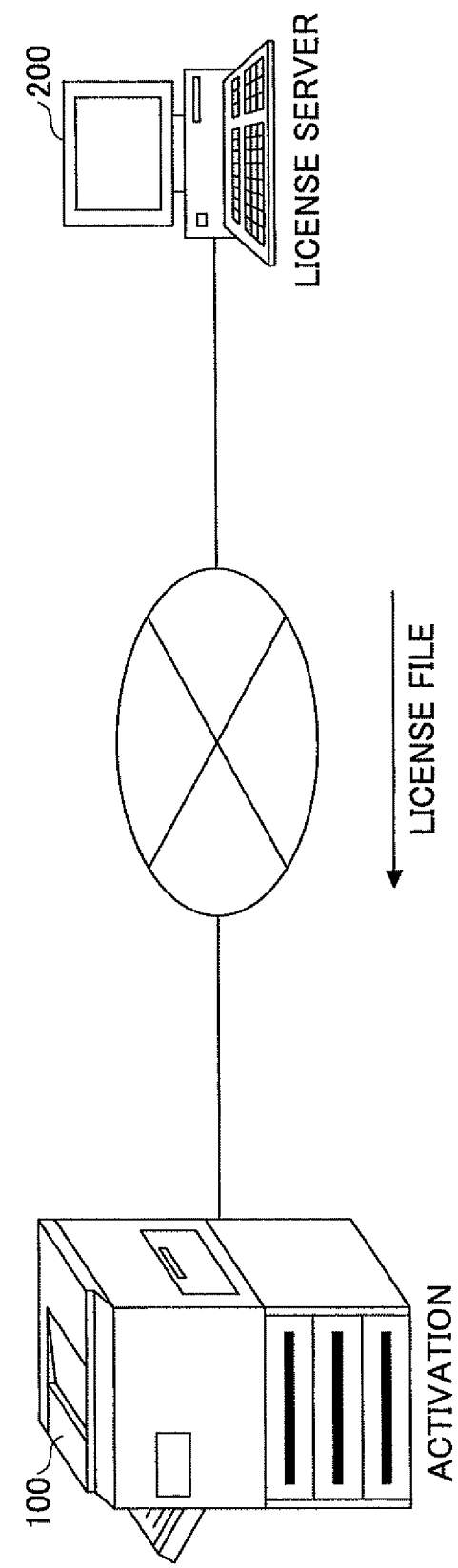
FIG. 2 is a block diagram illustrating the composition of a license system which includes an image forming device to which an embodiment of the invention is applied and a license server.

A description will be given of embodiments of the invention with reference to the accompanying drawings.

FIG. 1A and FIG. 1B are diagrams for explaining an example of activation in an image forming device of an embodiment of the invention. The image forming device 100 of this embodiment performs activation for each sales package. Because each sales package contains one or more function packages, all the function packages contained in the sales package are activated by the activation.

In the state illustrated in FIG. 1A, only a sales package A is first activated. A function package 1 and a function package 2 which are contained in the sales package A are activated. A function package 2 and a function package 3 are contained in a sales package B. Because activation of the sales package B is not performed, the function package 3 is in a deactivated state. In starting information 77, function packages which can be started by the image forming device 100 are registered. Therefore, only the function package 1 and the function package 2 are registered in the starting information 77.

On the other hand, when activation of the sales package B is performed as in FIG. 1B, the function package 3 is also activated. Then the function package 3 is newly registered in the starting information 77. Because the function package 2 contained in the sales package B is already activated, it is not newly added to the starting information 77.

The image forming device 100 of this embodiment can perform activation of each sales package, and thereby activate a plurality of function packages (which correspond to a plurality of plug-in components 73) which can be effectively used as a result of association of some of functions provided by the plurality of programs of the sales package. When performing activation of the purchased programs, confusion of the user in the selection of the programs to be activated can be avoided.

In this embodiment, installation of a plug-in component 73 means that the plug-in component 73 is stored in a storage unit of the image forming device 100, and activation of a plug-in component 73 means that a state where the plug-in component 73 stored in the storage unit is changed to a state where the plug-in component 73 can be started with starting of the image forming device 100.

Conversely, in this embodiment, uninstallation of a plug-in component 73 means that the plug-in component 73 is erased from the storage unit of the image forming device 100, and deactivation of a plug-in component 73 means that a state of the plug-in component 73 is changed to a state where the plug-in component 73 is not started if the image forming device 100 is started.

Installation and activation may be performed simultaneously, and uninstallation and deactivation may be performed simultaneously.

FIG. 2 illustrates the composition of a license system 300 which includes an image forming device 100 to which an embodiment of the invention is applied, and a license server 200.

The image forming device 100 is connected to the license server 200 via a network which is, for example, the Internet or an LAN (local area network).

For example, the license server 200 is constructed by a computer including a CPU, a RAM, a ROM, a non-volatile memory, a communication device, an input/output interface, etc. which are interconnected by a bus. The license server 200 creates a license file 76 which will be described later.

For example, the image forming device 100 is constructed by a multi-function peripheral (MFP) which includes one or more functions of a printer, a copier, a facsimile, and a scanner. Although the image forming device 100 includes hardware elements specific to image forming devices, such as a printing part and a scanner part, the image forming device 100 may be considered an information processing device in performing one or more plug-in components 73. Therefore, the installing method of plug-in components 73 by the image forming device of this embodiment is suitably applicable to an information processing device which is not provided with a printing function.

The information processing device, provided by the image forming device 100 in this case, includes a CPU, a main storage, an auxiliary memory, a non-volatile memory, a communication device (which is linked to a network), a recording medium I/F (to which a recording medium is attached), an input device (which includes a keyboard and a mouse), and a display control part (which displays an image on a display device), which are interconnected by a data bus.

Figure 3:
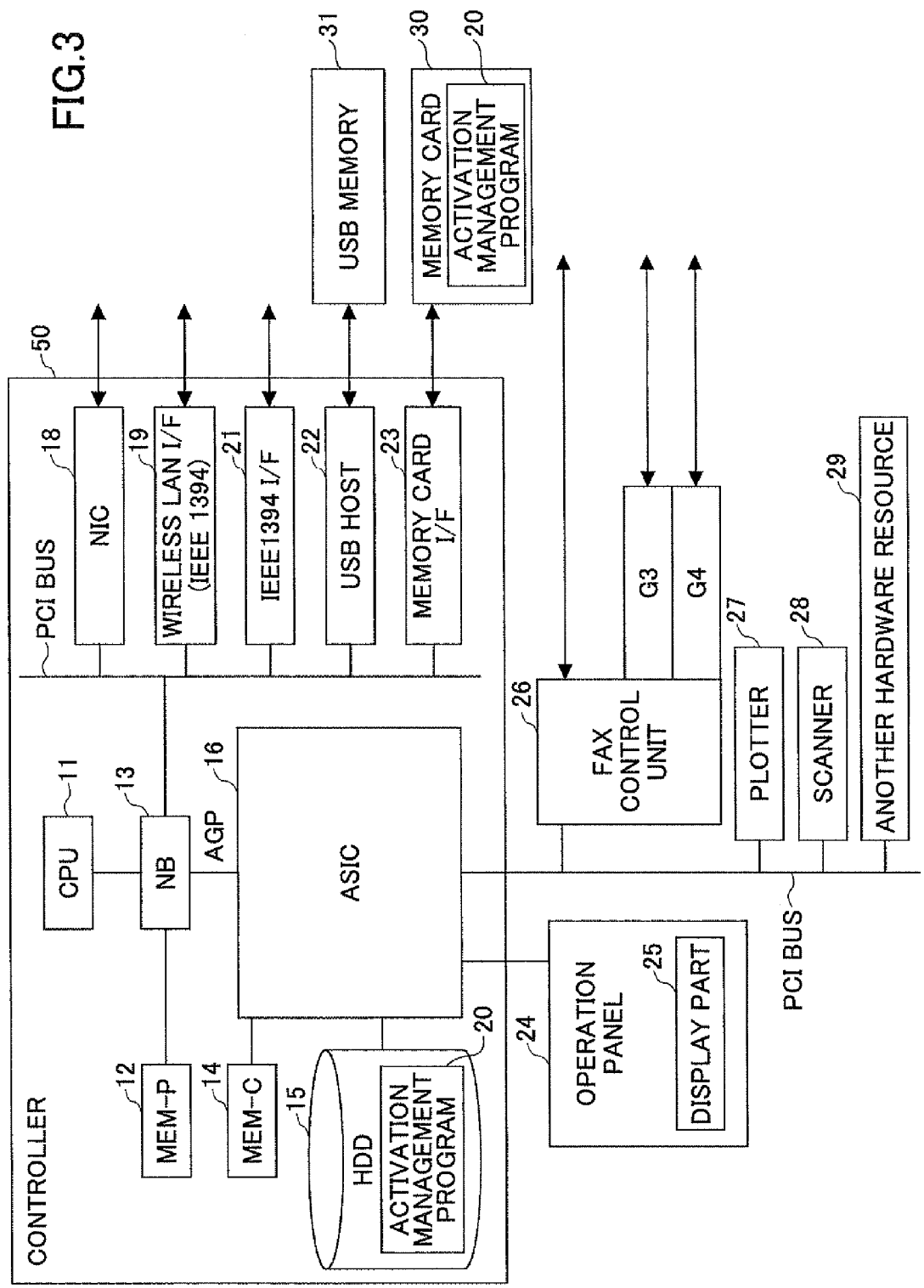
FIG. 3 is a block diagram illustrating the hardware composition of an image forming device of an embodiment of the invention.

FIG. 3 illustrates the hardware composition of an image forming device 100 of an embodiment of the invention.

The image forming device 100 of this embodiment includes a controller 50, a plotter 27, a scanner 28, a fax control unit 26, and another hardware resource 29, which are interconnected by a serial inter-bus, such as a PCI bus, a PCI-X bus or PCI-Express. An operation panel 24 is connected to the controller 50. A storage medium (memory card) 30 which stores an activation management program 20 is detachably attached to the controller 50.

The controller 50 is a control part which controls the whole image forming device 100. The controller 50 controls various processes which include reading of documents, printing, facsimile transmitting/receiving, inputting of messages from the operation panel 24, etc. by using the fax control unit 26, the plotter 27, the scanner 28, and the hardware resource 29.

The plotter 27 is constructed by a monochrome plotter and/or a 1-drum color plotter. The plotter 27 forms an image for each page based on a printing job data or image data obtained by the reading of the scanner 28. The image is transferred to a recording sheet. For example, by using the electrophotographic printing process using a laser beam, a toner image is formed on a photoconductor drum, the toner image is transferred to a recording sheet, and the recording sheet is subjected to heat and pressure by a fixing device, so that the recording sheet is output.

The scanner 28 optically reads a document placed on the contact glass, performs the A/D conversion of the reflected light, performs image processing of the resulting image signal, such as error diffusion and gamma conversion, and transforms the processed image signal into the digital data of a predetermined resolution to generate image data.

The fax control unit 26 is connected to a public telephone network via an NCU (network control unit). The fax control unit 26 transmits and receives a facsimile data according to the communications protocols which are in conformity with, for example, the G3 and G4 facsimile standards. Before transmitting the facsimile data, the fax control unit 26 performs data processing of image data, such as compression and modulation. After receiving the facsimile data, the fax control unit 26 performs decompression and error correction of the received facsimile data to restore the image data.

The controller 50 includes a CPU 11, a north-bridge (NB) 13, a system memory (MEM-P) 12, a south-bridge (SB), a local memory (MEN-C) 14, an ASIC (application-specific integrated circuit) 16, a hard disk drive (HDD) 15, an NIC (network interface card) 18, a wireless LAN I/F 19, an IEEE-1394 I/F 21, a USB host 22, and a memory card I/F 23. An ASP (accelerated graphics port) is arranged to connect the ASIC 16 and the NB 13.

The CPU 11 controls the whole image forming device 100 through the MEM-P 12, the ASIC 16, and the NB 13. The NB 13 performs transmission control of the data which are delivered on the bus which connects the wireless USB host and others.

The NB 13 is a bridge IC for connecting the CPU 11, the MEM-P 12 and the AGP. The MEM-P 12 is a system memory which is used as a drawing memory in the image forming device 100.

The MEM-C 14 is a local memory which is used as a copy image buffer and a coding buffer. The ASIC 16 is provided with various registers and logical circuits. The ASIC 16 functions as a head pulse generating part. The ASIC 16 functions as a control part of various motor drivers. Furthermore, the ASIC 16 functions as the bridge which interconnects the AGP, the HDD 15, and the MEM-C 14, respectively.

The operation panel 24 is an operation unit which receives input information from or displays message information to the user. The operation panel 24 includes a keyboard and a touch panel as an input part. The operation panel 24 further includes a display device, such as a LCD (liquid crystal display).

The HDD 15 is a storage part which accumulates image data, programs, font data, and forms. The HDD 15 may be constituted by a non-volatile memory, such as a flash memory, MRAM (magneto-resistive random access memory), etc. In this embodiment, an activation management program 20 which manages activation of programs is stored in the HDD 15.

The AGP is a bus interface for graphics accelerator cards, which is adapted to accelerate graphic processing. The AGP directly accesses the system memory to accelerate processing of a graphics accelerator card with a high throughput.

The NIC 18 is, for example, an Ethernet (registered trademark) card, and performs processing in accordance with the protocols specified for the physical layer and the data link layer of the OSI basic reference model. In association with the NIC 18, a mail application (which will be described later) performs processing in accordance with the upper-layer protocol, such as SMTP or POP3, to receive or transmit an e-mail between the image forming device 100 and the license server 200. Moreover, a web application (which will be described later) performs processing in accordance with the upper-layer protocol, such as FTP or HTTP, to receive or transmit a license file between the image forming device 100 and the license server 200.

The wireless LAN I/F 19 is an interface for communicating with devices which are provided to meet the requirements of the telecommunications standards IERE 802.11 a/b/g. The wireless LAN I/F 19 is connected to a network, such as an LAN, via an access point. The IEEE-1394 I/F 21 is an interface for communicating with devices which are provided to meet the requirements of the telecommunications standards IEEE 1394. The IEEE-1394 I/F 21 may be used to establish a daisy chain connection of a plurality of devices. This interface is suitable for transmitting data with large sizes, such as video data, and the devices to which the IEEE-1394 I/F 21 is connected are, for example, a digital camera, a video camera, etc.

The USB host 22 is an IC which is called a USB controller. The USB host 22 is controlled by the device driver (driver software) which is executed by the CPU 11 to constitute a USB I/F. The USB host 22 communicates with a USB memory 31 which is inserted into the USB slot of the controller 50. Similarly, the memory card I/F 23 communicates with a memory card 30 which is inserted into the slot of the controller 50. The memory card I/F 23 is an interface for reading data from the memory card 30 and for writing data to the memory card 30. The memory card 30 is, for example, an SD card, a multimedia card, an xD card, etc.

Figure 4:
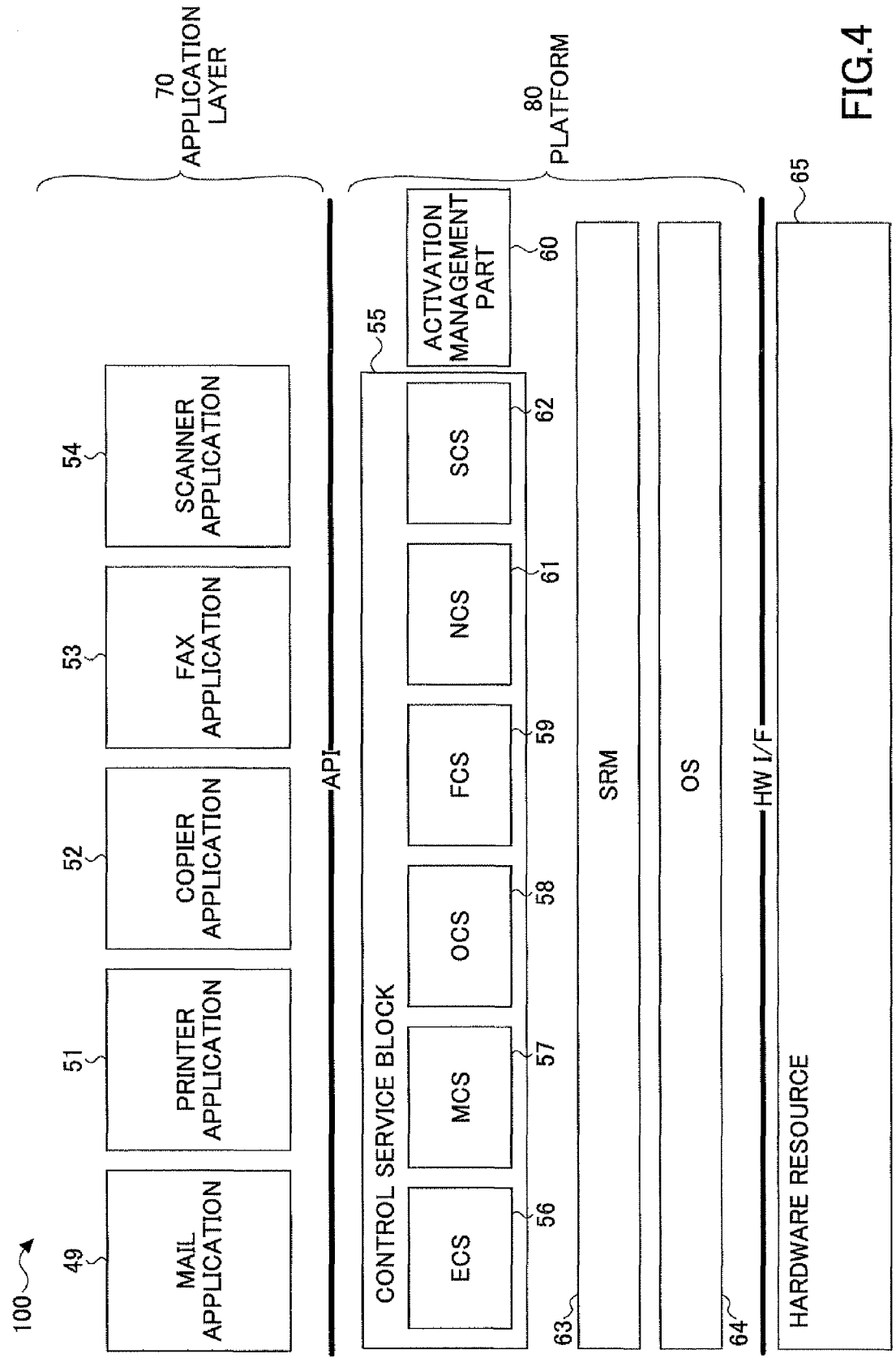
FIG. 4 is a block diagram illustrating the software composition of an image forming device of an embodiment of the invention.

FIG. 4 is a block diagram illustrating the software composition of the image forming device 100 of an embodiment of the invention.

The software composition of the image forming device 100 is connected to the plotter 27, the scanner 28, and the hardware resource 29 via the hardware interface (HW I/F). The software composition generally includes a platform 80 and an application layer 70.

As illustrated in FIG. 4, the platform 80 includes a control service block 55 which interprets a processing request from the application layer 70 and generates an acquisition request to the hardware resources, a system resource manager (SRM) 63 which manages one or more hardware resources and arbitrates acquisition requests from the control service block 55, an operating system (OS) 64, and an activation management part 60.

The control service block 55 is constructed by a plurality of control service modules. The control service block 55 includes an SCS (system control service) 62, an ECS (engine control service) 56, an MCS (memory control service) 57, an OCS (operation panel control service) 58, an FCS (fax control service) 59, and an NCS (network control service) 61.

The platform 80 includes an API (application programming interface) which receives a processing request from the application layer 70 by the pre-defined program.

The OS 64 is a general-purpose operating system, such as LINUX (registered trademark) or UNIX (registered trademark). The OS 64 is capable of performing the respective programs of the platform 80 and the application layer 70 in parallel as processes, respectively. The OS 64 includes various kinds of device drivers which respectively communicate with the NIC 18, the wireless LAN I/F 19, the IEEE 1394 I/F 21, the USB host 22, and the memory card I/F 23.

The SRM 63 performs control of the system and management of the resources in association with the SCS 62. The process of the SRM 63 performs scheduling of the use of the hardware resource in response to the request from the upper layer, and controls operation of the hardware resource.

The process of the SCS 62 performs management of the applications, control of the operation panel 24, displaying of the system screen, displaying of the LED, resource management, control of the interrupting applications, etc. The process of the ECS 56 controls the engines of the hardware resources.

The process of the MCS 57 performs acquisition and releasing of the image memory, utilization of the HDD 15, compression and decompression of image data, etc. The process of the FCS 59 provides the API for performing facsimile receiving and transmitting from the application layer of the system controller using the PSTN/ISDN network, registering/accessing of various facsimile data stored in the backup SRAM, facsimile reading, facsimile receiving/printing, and combined transmitting/receiving.

The process of the NCS 61 is a process for providing the services which can be used in common by the application-layer 70 which requires the network I/O. The process of the NCS 61 performs data transferring at the time of distributing data received in accordance with each protocol from the network to each application of the application layer 70, or at the time of transmitting data from the application layer 70 to the network. Specifically, the NCS 61 includes various demons of the respective protocols, such as FTP, provides client functions of the respective protocols.

The process of the OCS 58 controls the operation panel 24 which functions as an information transmitting part between the user and the controller 50. The OCS 58 includes the portion which acquires key-in information input from the operation panel 24 as a key event and transmits a key event function corresponding to the acquired key-in information to the SCS 62, and the portion of the OCS function library in which drawing functions to output various screens to the display part 25 in response to the requests from the application layer 70 or the control service block 55, as well as other functions to perform control of the operation panel 24, are registered beforehand.

The application layer 70 includes a mail application 49 which transmits and receives an e-mail, a printer application 51 for a printer (the plotter 27), a copier application 52 for a copier (the scanner 28 and the plotter 27), a fax application 53 for a fax (the FCU 26), and a scanner application 54 for the scanner 28.

The activation management part 60 is arranged in the control service block 55. The activation management part 60 works as a process in the control service block 55, and performs activation/deactivation processes of the various kinds of plug-in components 73 which constitute the function packages, and various other processes related to the activation/deactivation processes, which will be described later.

Figure 5:
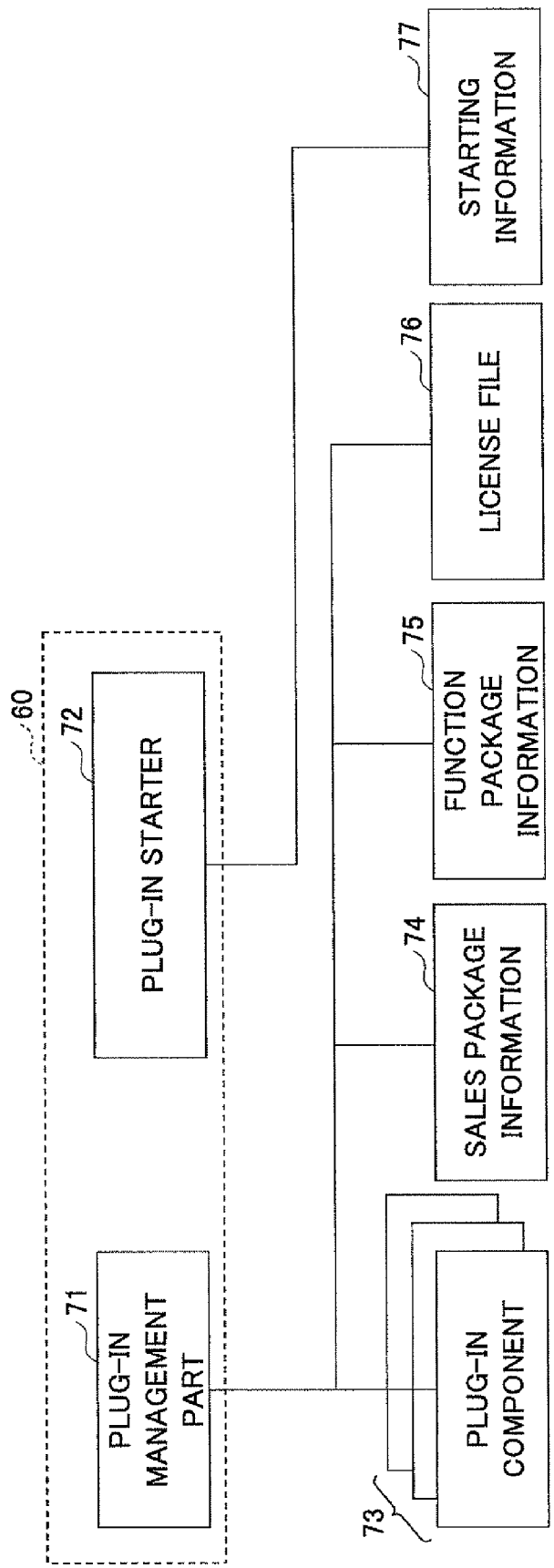
FIG. 5 is a block diagram illustrating the functional composition of an activation management part in the image forming device.

FIG. 5 is a block diagram illustrating the functional composition of the activation management part 60 in the image forming device 100.

As illustrated in FIG. 5, the activation management part 60 includes a plug-in management part 71 and a plug-in starter 72. The activation management part 60 is constituted by the CPU 11 executing the activation management program 20 or by using a predetermined microprocessor.

The plug-in management part 71 performs processing of installation/uninstallation, activation/deactivation, etc. of various plug-in components 73. The plug-in starter 72 performs starting processing of each plug-in component 73 by making reference to the starting information 77 at the time of starting of the image forming device 100. Namely, the plug-in starter 72 starts each plug-in component 73 which is registered in the starting information 77.

For example, the plug-in components 73, the sales package information 74, the function package information 75, and the license file 76 are stored in the HDD 15. A plug-in component 73 is one of various kinds of programs installed in the image forming device 100, and there is a one-to-one correspondence between the plug-in component 73 and the function package managed by the plug-in management part 71.

The sales package information 74, the function package information 75, and the license information will be described later. Briefly, the sales package information 74 is information in which an activation state of a sales package which is purchased in the image forming device 100 is registered (the activation state indicating whether activation of the sales package is performed or not). The function package information 75 is information in which activation/deactivation of each of the function packages is registered. The license file 76 is created by the license server 200, and registered in the license file 76 as information which certifies the license of using the sales package activation of which is performed.

FIG. 6 is a diagram illustrating an example of a license file 76.

One line of the table illustrated in FIG. 6 is equivalent to a license file 76 of a single sales package. Hence, a plurality of license files 76 may be stored in the image forming device 100 in which activation of a plurality of sales packages is performed. However, in the following embodiment, the plurality of license files 76 are not distinguished from each other, and they are collectively called the license file 76.

In the Table as illustrated in FIG. 6, "License Unique ID" is an ID (identifier) which uniquely identifies a license file 76. Hence, once the license unique ID is assigned to the image forming device 100 (or information processing device), that license unique ID is never assigned to a license file 76 of another image forming device or information processing device.

"Sales Package ID" is an ID (identifier) of a sales package which has been the object of activation. Hence, if the license file 76 is referred to, the sales package currently purchased in the image forming device 100 (the user) can be identified.

"Lock Code" is an ID (identifier) which uniquely identifies the image forming device 100 (or information processing device) to which the license file 76 is assigned. In the image forming device 100, a lock code which is specific to the image forming device 100 is stored in, for example, the system memory MEM-P 12, and the image forming device 100 transmits this lock code to the license server 200. Even if an authorized person is going to copy the license file 76 to another image forming device 100, activation cannot be performed with the copied license file 76 because the lock code of the license server 200 and the lock code from such image forming device 100 are not in agreement.

"Expiration Date" is an expiration date of the license file 76 itself or the contents described in the license file 76. By requesting an update process for updating the current expiration date to the license server 200, the image forming device 100 can obtain a new expiration date.

"Date of Creation" is the date/time the license file 76 is created by the license server 200. By using the date/time of creation in "Date of Creation", checking whether the system clock of the image forming device 100 is reliable can be performed. Namely, this checking is performed in order to detect whether the system clock of image forming device 100 is illegally turned back in order to avoid restriction of the expiration date.

The license server 200 generates a license file 76 for each sales package. For example, when the image forming device 100 accesses the license server 200 for the first time, or when a sales package is installed in the image forming device 100 for the first time, the license server 200 generates a license file 76. The license server 200 generates a license unique ID which is a different ID from the lock code and does not overlap with the previously generated license unique IDs. Preferably, the license server 200 generates a license unique ID which is not a consecutive number.

The license server 200 stores a master file of the license file 76 and transmits a copy of the master file to the image forming device 100. In response, the plug-in management part 71 stores the license file 76 in the HDD 15, for example.

The license file 76 may be encrypted by using the lock code. In such a case, decryption of the encrypted license file 76 which is illegally performed by other image forming devices 100 with a different lock code can be prevented.

The relationship between the sales package information 74 and the function package information 75 before and after activation will be explained.

Figure 7A:
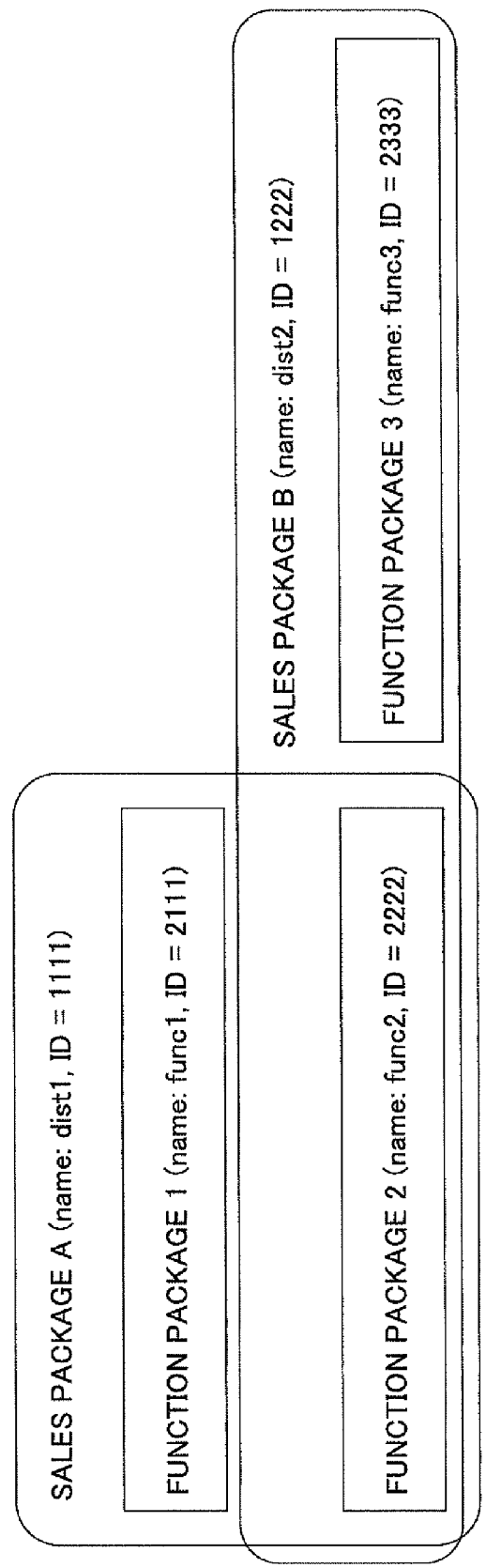
FIG. 7A and FIG. 7B are diagrams illustrating an example of function packages included in sales packages A and B.

FIG. 7A illustrates an example of function packages included in sales packages A and B. As illustrated in FIG. 7A, the function package 2 is included in both the sales packages A and B.

In FIG. 7A, it is assumed that activation of the sales package B is performed initially. The sales package information 74 is generated by the plug-in management part 71 at the time the plug-in component 73 is installed. Therefore, the function package which is included in each of the sales packages A and B is detected beforehand by the plug-in management part 71.

Figure 7B:
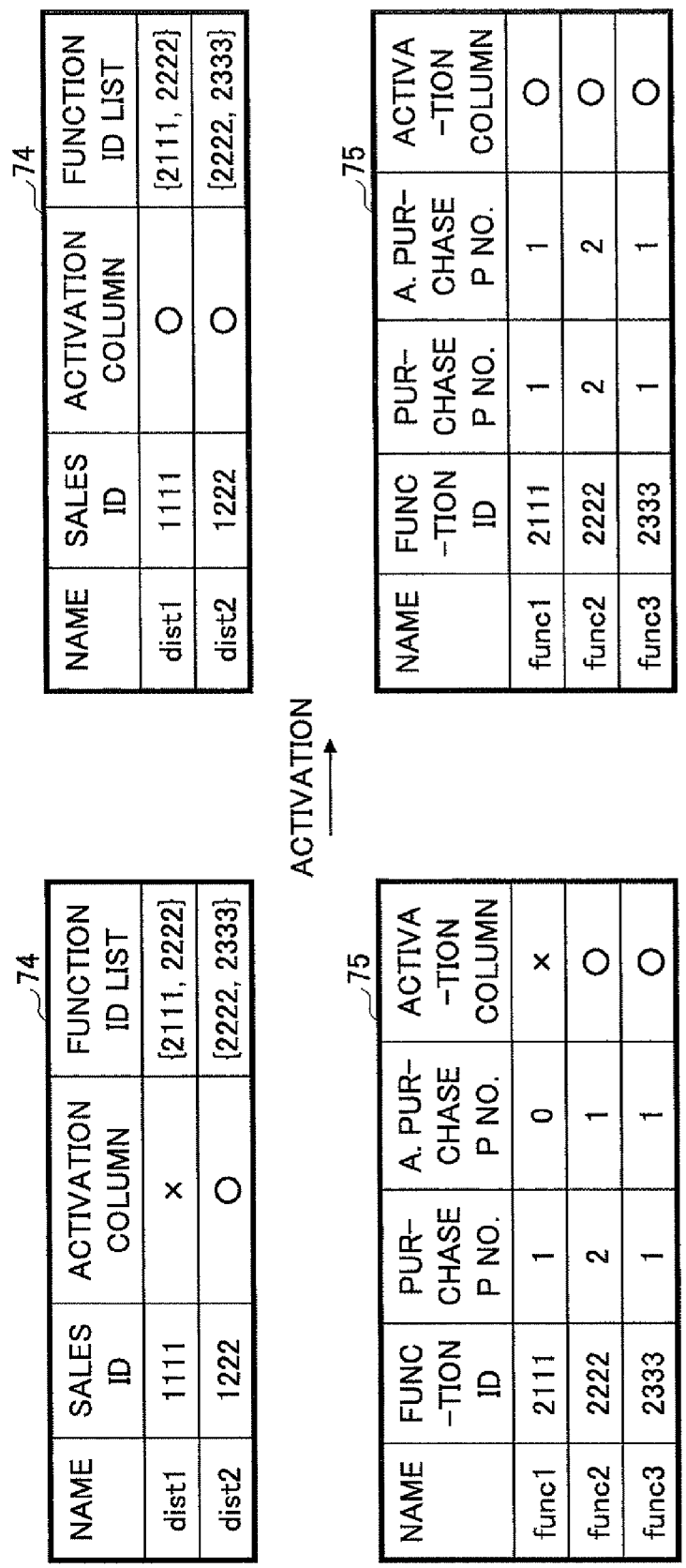

FIG. 7B illustrates an example of the sales package information 74 and the function package information 75 before and after an activation process for the sales package A is performed. In the sales package information 74, the "name" of each sales package, the "sales ID" which uniquely identifies each sales package, the "activation column" which indicates whether activation for each sales package is performed, and the "function ID list" which is a list of IDs of function packages included in each sales package are registered.

As is apparent from the sales package information 74 in which activation of only the sales package B is performed, the two sales packages "dist1" (sales ID=1111) and "dist2" (sales ID=1222) are purchased in the image forming device 100, which indicates that the package "dist1" is in a deactivated state and the package "dist2" is in an activated state. The sales package "dist1" includes the function packages with the function IDs "2111" and "2222", and the sales package "dist2" includes the function packages with the functions ID "2222" and "2333", respectively.

In the function package information 75, the "name" of each function package, the "function ID" which uniquely identifies each function package, the "purchase P number" which indicates the number of the function packages purchased in the image forming device 100, the "activation purchase P number" which indicates the number of the function packages which are activated among the purchased function packages, and the "activation column" which indicates whether activation for each function package is performed are registered.

As is apparent from the function package information 75 in which activation of only the sales package B is performed, the numbers of the respective function packages with the names "func1", "func2" and "func3", which are purchased in the image forming device 100, are 1, 2, and 1, respectively. The function package "func2" is common to the sales packages A and B, and the "purchase P number" of function package "func2" is 2.

In the state in which activation of only the sales package B is performed, the function package "func2" and the function package "func3" are activated. Hence, the "activation purchase P number" of the function package "func1" is set to "0", the "activation purchase P number" of each of the function packages "func2" and "func3" is set to "1". The "activation column" is set to "O" when at least one of the function packages included is activated. Hence, the "activation column" of each of the function packages "func2" and "func3" is set to "O".

When activation of the sales package A is performed, the function packages 1 and 2 included in the sales package A are activated. First, "O" is registered in the "activation column" of the name "dist1" of the sales package information 74 by the activation of the sales package A. Second, both the function packages 1 and 2 in the sales package A are activated, and the "activation purchase P number" of each of the name "func1" and the name "func2" of the function package information 75 is incremented, respectively. Moreover, the "activation column" of the name "func1" of the function package information 75 is set to "O".

In this manner, the plug-in management part 71 updates the sales package information 74 and the function package information 75 in accordance with the activation of the sales package A.

Figure 8:
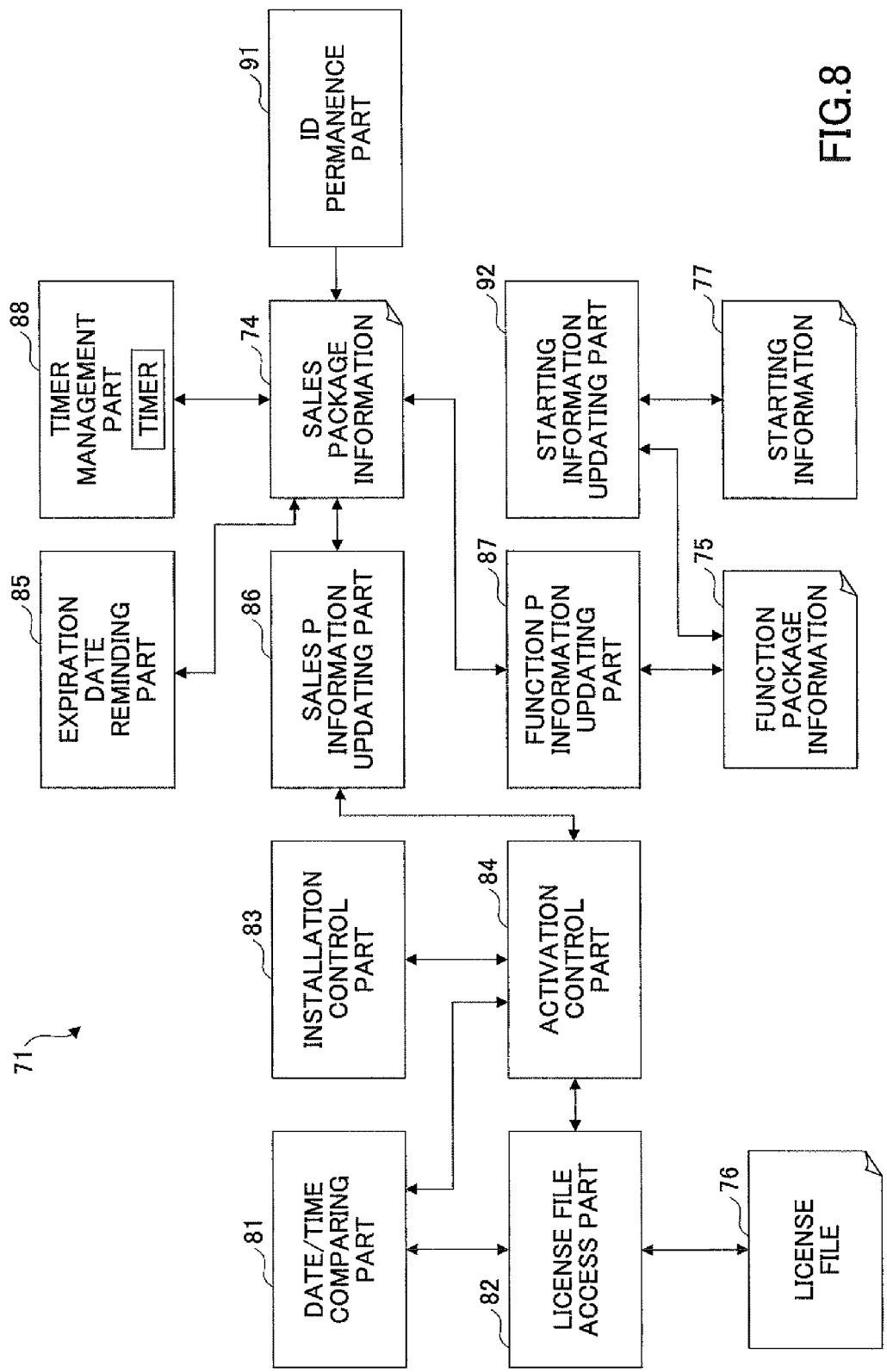
FIG. 8 is a block diagram illustrating the functional composition of a plug-in management part in the image forming device.

FIG. 8 is a block diagram illustrating the functional composition of the plug-in management part 71 in the image forming device 100.

In the plug-in management part 71 illustrated in FIG. 8, an activation control part 84 controls the whole activation process, and performs activation of each function package per sales package. The activation control part 84 returns the state of the activated function package to a deactivated state (or non-activation state), if needed.

An installation control part 83 installs each function package at the time of purchasing of a sales package, and uninstalls each function package if needed. A starting information updating part 92 registers into the starting information 77 the function package which is activated by the activation, by making reference to the starting information 77.

A sales P information updating part 86 updates the sales package information 74 according to the activation, as illustrated in FIG. 7B. Similarly, when a function package is deactivated, the sales P information updating part 86 updates the sales package information 74.

A function P information updating part 87 updates the function package information 75 according to the activation, as illustrated in FIG. 7B. Similarly, when a function package is deactivated, the function P information updating part 87 updates the function package information 75.

A license file access part 82 can perform the process which is allowed to access the license file 76, and provides the information read from the license file 76, to another functional block. The license file access part 82 verifies the electronic signature of the license file 76, and authenticates the license file 76 only when its electronic signature matches with the correct electronic signature.

A date/time comparing part 81 compares the date/time of creation of the license file 76 with the current date/time of the system clock. When the former precedes the latter, the date/time comparing part 81 causes the activation control part 84 to inhibit activation, thereby preventing the unauthorized use of the license file 76.

An expiration date reminding part 85 sends the user a reminding message reminding the user of the expiration date, when the expiration date of a sales package is approached. A timer management part 88 sets up the timer for detecting expiration of an expiration date for each sales package, and performs uninstallation of the sales package concerned when the set-up date/time thereof is reached. An ID permanence part 91 performs an ID permanence process to set a license unique ID to a permanent ID, and inhibits duplication of license unique IDs of sales packages.

An example of activation of a sales package performed by the image forming device of an embodiment of the invention will be described with reference to FIGS. 9A, 9B, 10A and 10B.

As illustrated in FIG. 9A, sales packages A-D are installed in the image forming device 100, and activation of the sales packages A and B among them is performed initially. In this state, function packages 1, 2, and 5 are included in the sales package A, and function packages 1 and 3 are included in the sales package B. Hence, the activated function packages are the function packages 1, 2, 3, and 5. In the state of FIG. 9A, it is not necessary that sales packages C and D be installed in the image forming device 100 at that time.

In the sales package information 74: "activation column" of sales package C="x".

In the function package information 75: "activation purchase P number" of function package 4="O", and "activation column" of function package 4="x".

Figure 9B:
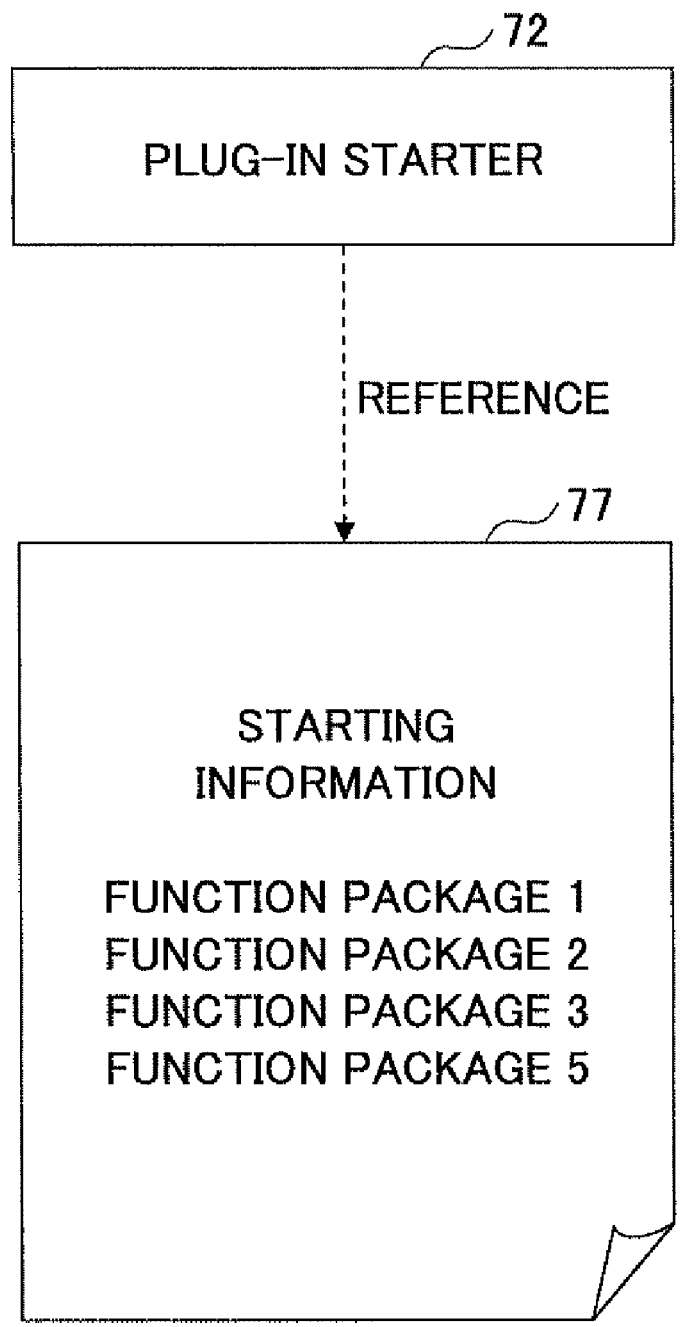
Figure 10B:
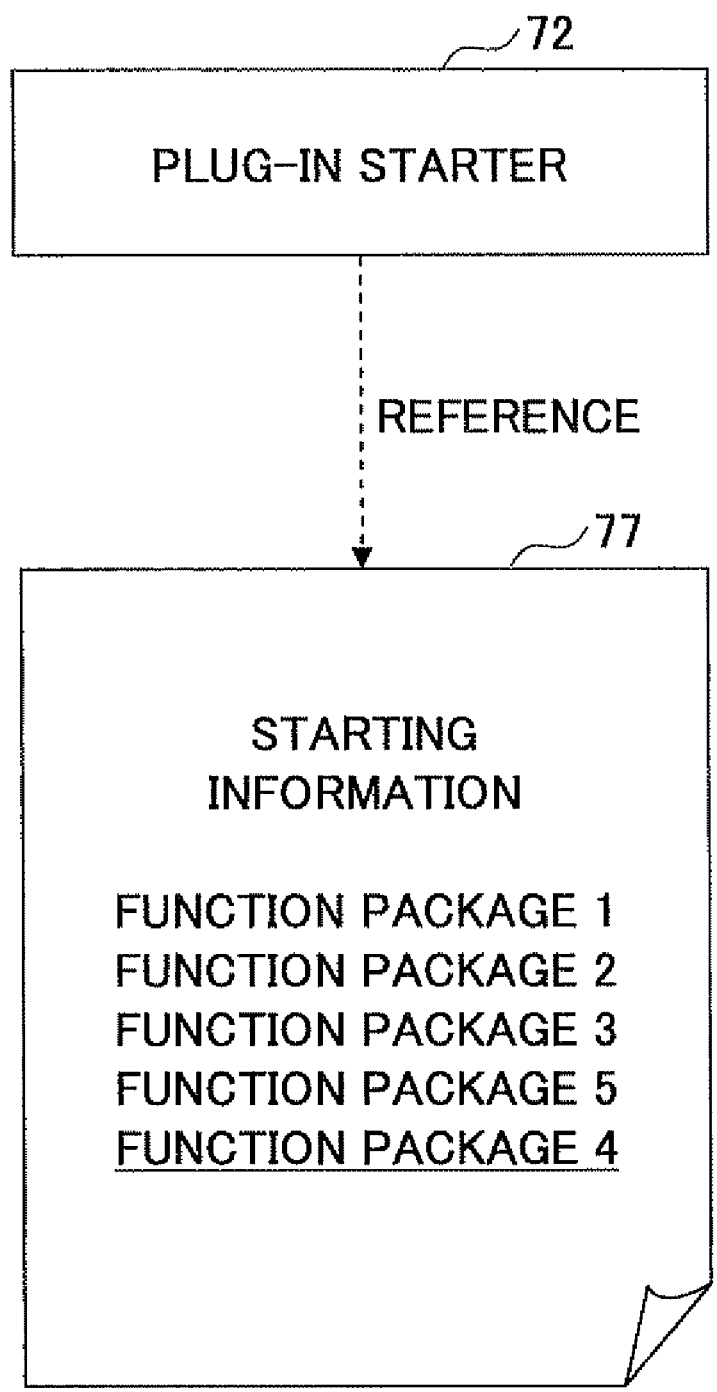

For this reason, in the starting information 77 illustrated in FIG. 9B, the function packages 1, 2, 3, and 5 are registered. Hence, the plug-in starter 72 starts the function packages 1, 2, 3, and 5 at the time of starting of the image forming device 100.

Subsequently, as illustrated in FIG. 10A, the activation of sales package C or installation of sales package C is performed by the input operation of the user. The activation control part 84 makes reference to the sales package information 74 and determines the function packages activation of which is to be performed, based on the "function ID list" of the sales package information 74. The activation control part 84 detects whether the function packages 2 and 4 are included in the plug-in components 73 stored in the HDD 15, and performs activation of the function packages 2 and 4.

First, the sales P information updating part 86 sets the "activation column" of the sales package C in the sales package information 74 to "O". The function P information updating part 87 sets the "activation column" of function package 4 in the function package information 75 to "O". The function P information updating part 87 increments the "activation purchase P number" of each of function packages 2 and 4 in the function package information 75, respectively.

The starting information updating part 92 makes reference to the function package information 75 and registers into the starting information 77 the function package 4 the "activation column" of which is newly set to "O". Hence, at the next time the image forming device 100 is started, the function package 4 will also be started.

Because activation of the function package 2 is already performed, the function package 2 is already registered in the starting information 77.

In the sales package information 74: "activation column" of sales package C="O", In the function package information 75: "activation purchase P number" of function package 4="1", and "activation column" of function package 4="O".

In this embodiment, the respective function packages included in each sales package can be set up in an activated or deactivated state on a sales package basis, and it is no longer necessary that the user performs activation of the respective function packages individually.

Next, an example of deactivation of a sales package performed by the image forming device of an embodiment of the invention will be described with reference to FIGS. 10A, 10B, 11A and 11B.

In this embodiment, if deactivation of a sales package is performed, each of the function packages included in the sales package can be set in a deactivated state.

It is assumed that, before deactivation of a sales package A is performed, activation of sales packages A, B, and C is initially performed, as illustrated in FIG. 10A. The state of the sales package A is returned to a deactivated state by the deactivation.

In the sales package information 74: "activation column" of sales package A="O".

In the function package information 75: "activation purchase P number" of function package 1="2", "activation column" of function package 1="O", "activation purchase P number" of function package 2="2", "activation column" of function package 2="O", "activation purchase P number" of function package 3="1", "activation column" of function package 3="O", "activation purchase P number" of function package 4="1", "activation column" of function package 4="O", "activation purchase P number" of function package 5="1", and "activation column" of function package 5="O".

Figure 11B:
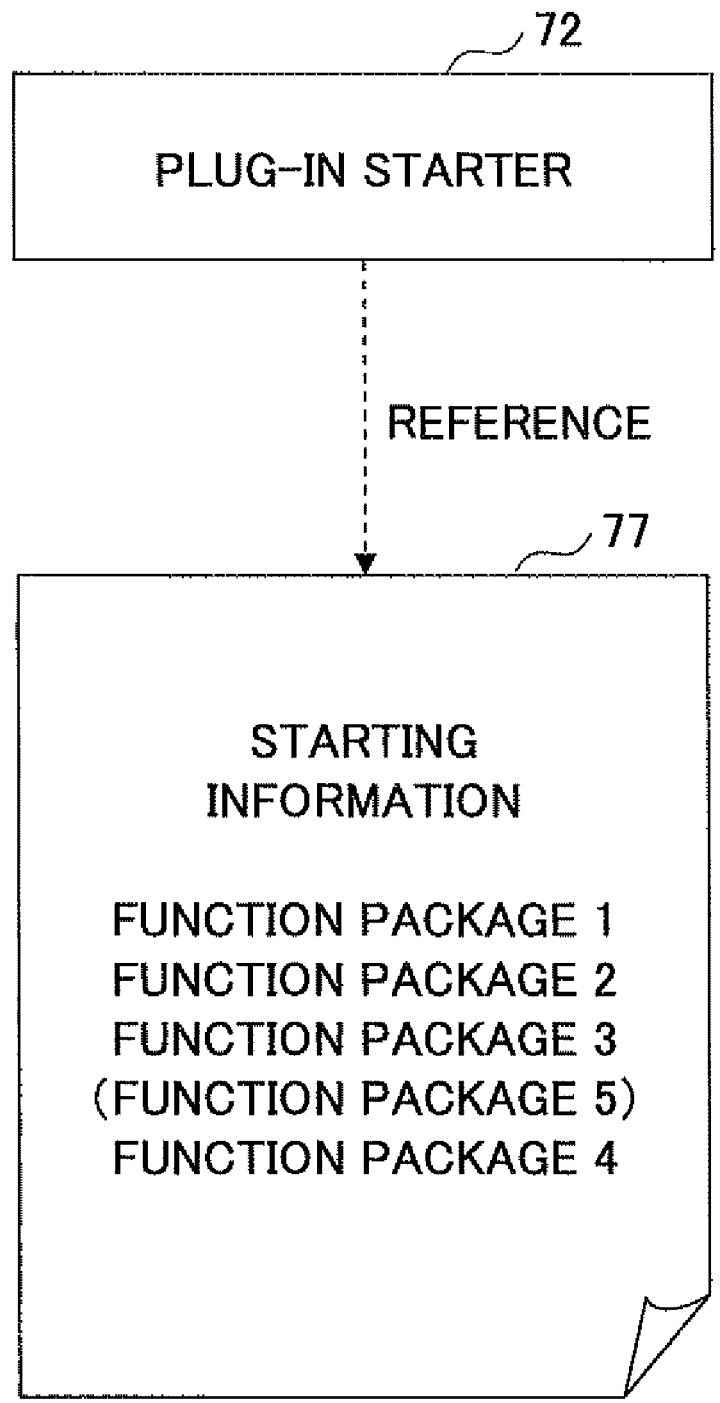

FIG. 11A and FIG. 11B are diagrams for explaining an example of deactivation of the sales package A. For example, deactivation or uninstallation of the sales package A is performed by input operation of the user.

As described above, if uninstallation of a sales package is performed, the sales package is always set in a deactivated state. In this meaning, uninstallation is the same as deactivation.

The activation control part 84 makes reference to the sales package information 74, and determines the function packages which are to be deactivated, based on the "function ID list" in the sales package information 74.

First, the sales P information updating part 86 sets the "activation column" of sales package A in the sales package information 74 to "x". The function P information updating part 87 sets the "activation column" of function package 5 to "x". The function P information updating part 87 decrements the "activation purchase P number" of each of the function packages 1, 2, and 5, respectively.

The starting information updating part 92 makes reference to the function package information 75, and deletes from the starting information 77 the function package 5 the "activation column" of which is newly set to "x". Hence, at the next time the image forming device 100 is started, the function package 5 will not be started.

In the sales package information 74: "activation column" of sales package "x".

In the function package information 75: "activation purchase P number" of function package 1="1", "activation column" of function package 1="O", "activation purchase P number" of function package 2="1", "activation column" of function package 2="O", "activation purchase P number" of function package 3="1", "activation column" of function package 3="O", "activation purchase P number" of function package 4="1", "activation column" of function package 4="O", "activation purchase P number" of function package 5="O", and "activation column" of function package 5="x".

In this embodiment, if deactivation or uninstallation of a sales package is performed, it is no longer necessary to perform deactivation or uninstallation of the respective program components included in the sales package individually.

Next, an example of uninstallation of a sales package with a time limit according to a timer, which is performed by the image forming device of an embodiment of the invention will be described with reference to FIGS. 12, 13A, 13B, 14A and 14B. In this embodiment, if the time limit is reached, the sales package is automatically uninstalled.

FIG. 12 illustrates an example of the sales package information 74 in which an expiration date can be registered.

As illustrated in FIG. 12, the expiration date is specified in the sales package A. For example, this expiration date may be directly input by the user from the operation panel 24. Alternatively, an expiration date which is, for example, one year later from the date of activation or the date of installation may be automatically set by the activation control part 84. Alternatively, an expiration date of a license file 76 may be used as the expiration date of the sales package A.

The activation control part 84 notifies the expiration date to the sales P information updating part 86, and the sales P information updating part 86 registers the received expiration date in the sales package information 74.

When the expiration date is set in the sales package information 74, the timer management part 88 sets up the timer for detecting expiration of an expiration date for each relevant sales package.

Figure 13A:
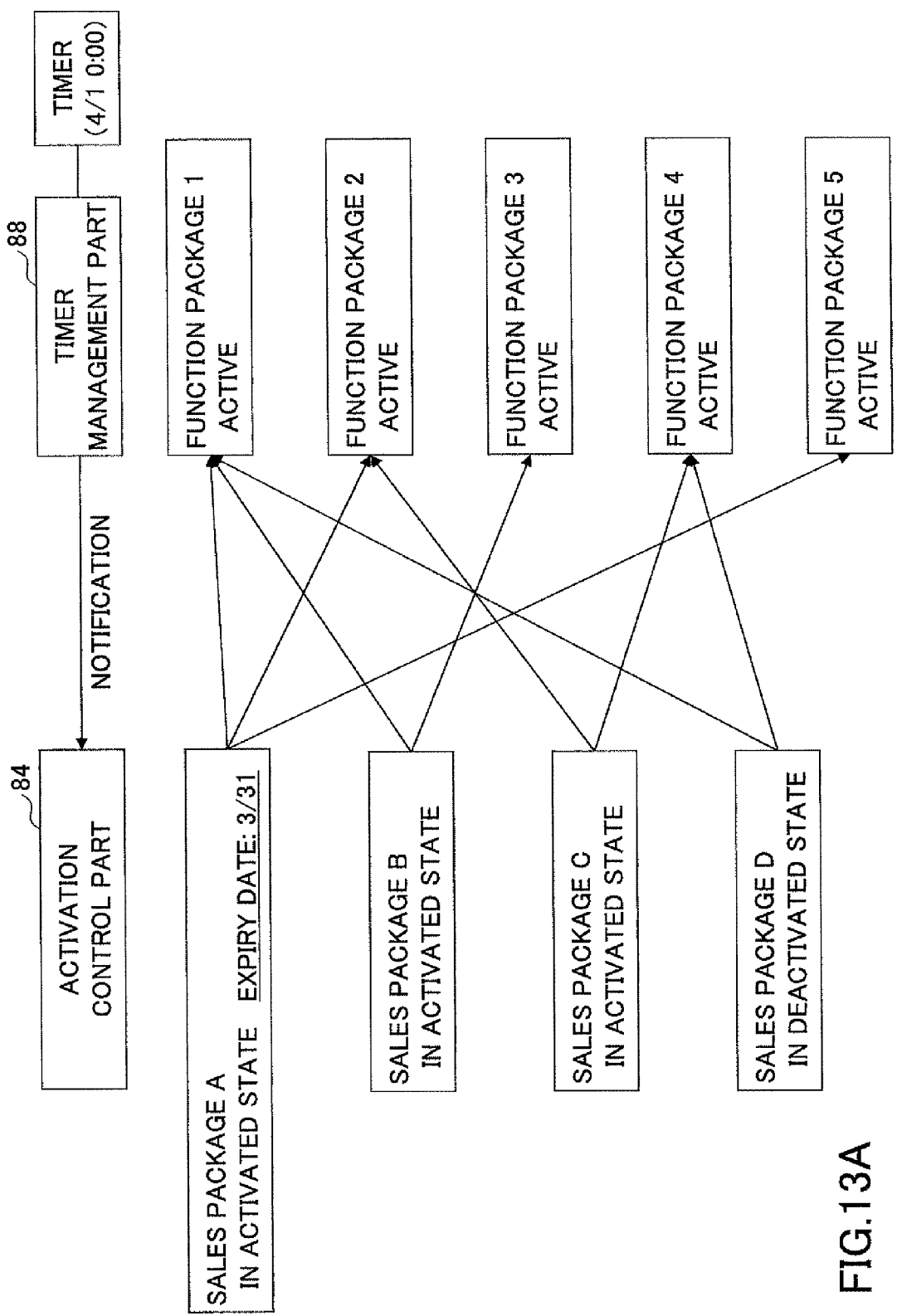
FIG. 13A and FIG. 13B are diagrams for explaining an example of uninstallation of a sales package according to a timer.
Figure 13B:
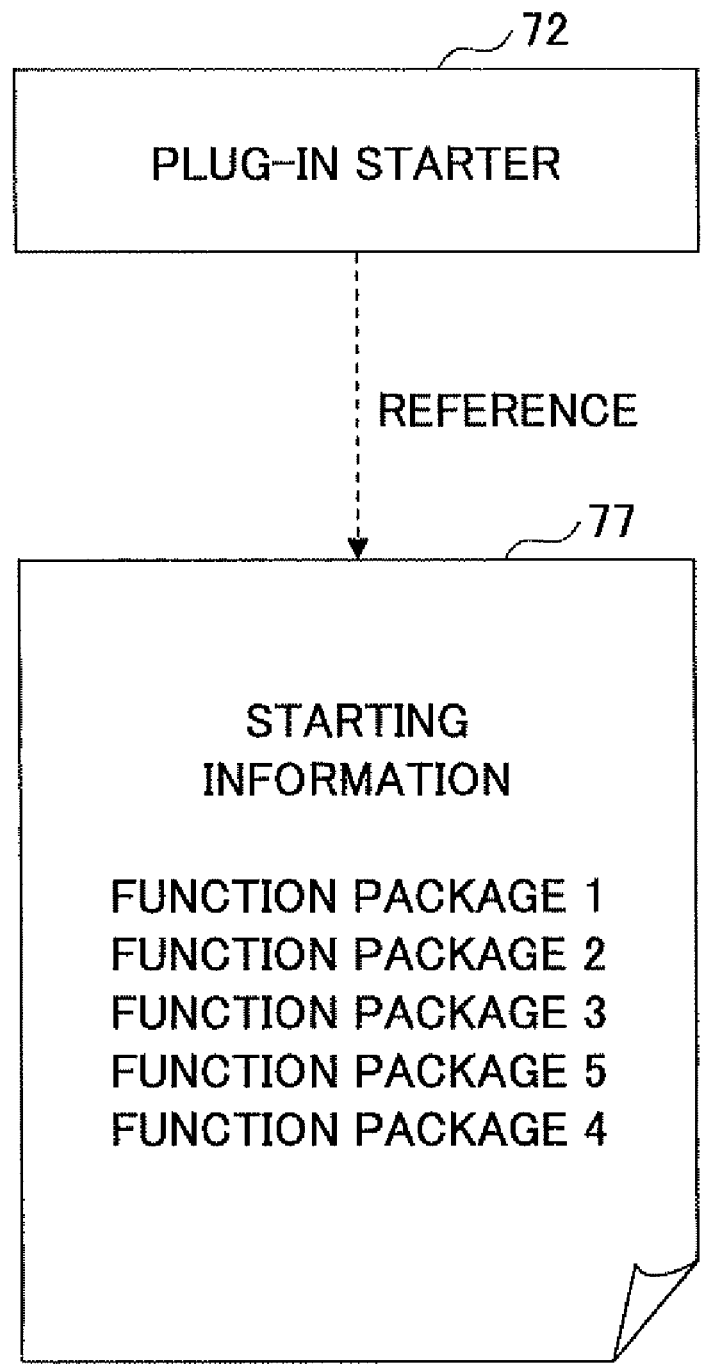

FIG. 13A is a diagram for explaining an example of uninstallation of a sales package according to a timer, and FIG. 13B is a diagram illustrating an example of starting information 77. The state of FIG. 13A is the same as that of FIG. 10A.

In the sales package information 74: "activation column" of sales package A="O", "activation column" of sales package B="O", "activation column" of sales package C="O", and "activation column" of sales package D="x".

In the function package information 75: "activation purchase P number" of function package 1="2", "activation column" of function package 1="O", "activation purchase P number" of function package 2="2", "activation column" of function package 2="O", "activation purchase P number" of function package 3="1", "activation column" of function package 3="O", "activation purchase P number" of function package 4="1", "activation column" of function package 4="O", "activation purchase P number" of function package 5="1", and "activation column" of function package 5="O".

As illustrated in FIG. 12A, the expiration date "3/31" is specified in the sales package A. The timer management part 88 sets the timer to a date/time which is 0:00 a.m. of the next day of this expiration date. Or the date/time is stored in the timer as a time limit.

The timer management part 88 compares the date/time of the timer with the current date/time which is extracted from the calendar information in the image forming device 100 or a predetermined server (which calendar information will be called a system clock). When the date/time of the timer precedes the current date/time, the timer management part 88 notifies the installation control part 83 of the expiration of the time limit of the sales package A. Hence, the installation control part 83 starts uninstallation of the sales package A.

Figure 14A:
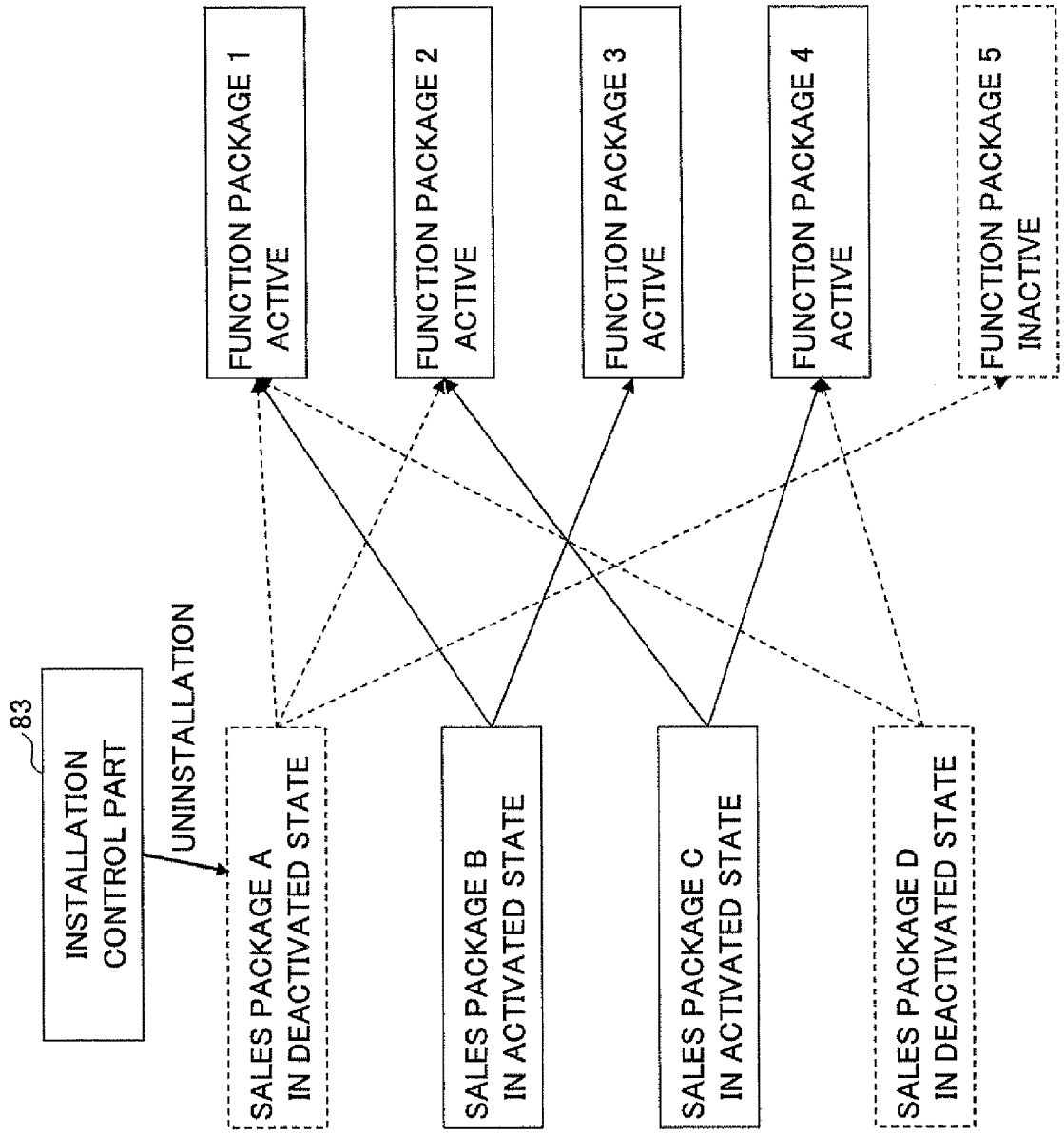
FIG. 14A and FIG. 14B are diagrams for explaining the relationship between sales packages and function packages after uninstallation of a sales package is performed.
Figure 14B:
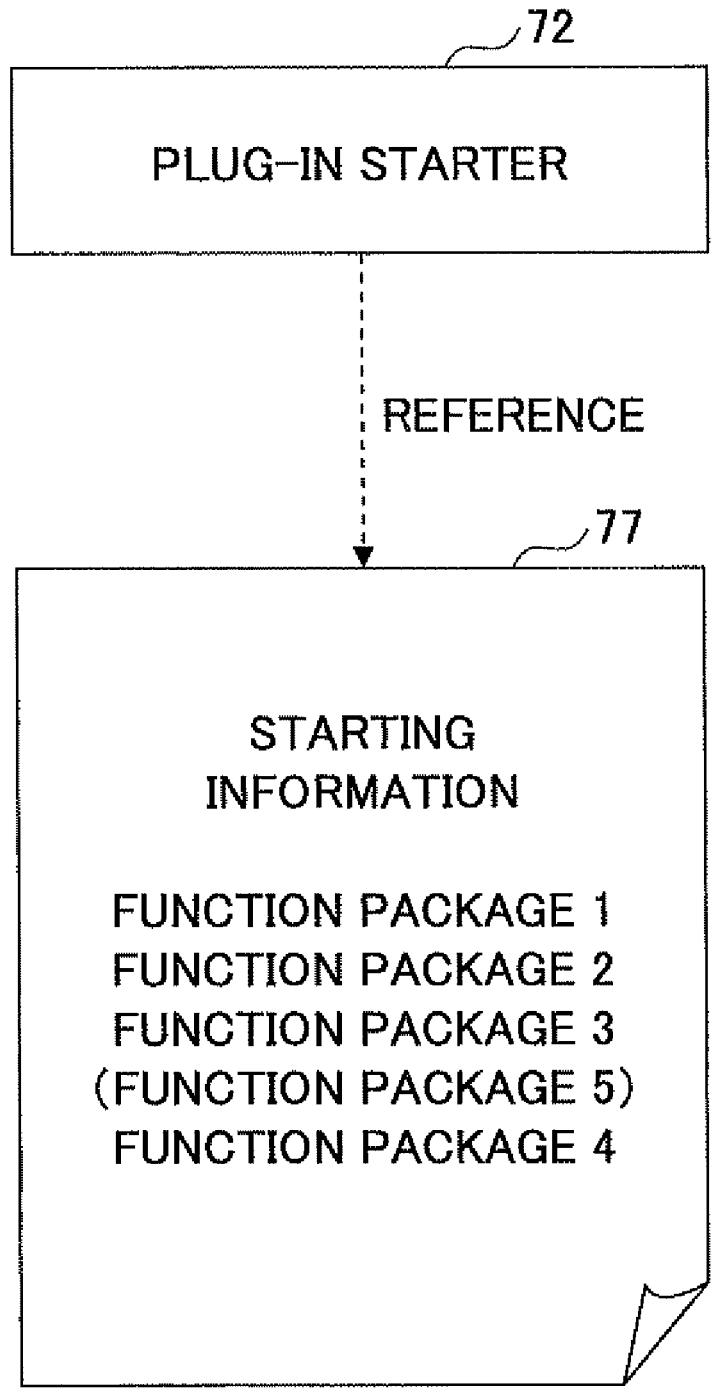

FIG. 14A is a diagram for explaining the relationship between the sales packages and the function packages after uninstallation of the sales package A is done. FIG. 14B is a diagram illustrating an example of the starting information 77.

The installation control part 83 makes reference to the sales package information 74, detects the function packages 1, 2, and 5 included in the sales package A, and notifies them to the sales P information updating part 86. Then, the installation control part 83 performs uninstallation of the sales package A. Uninstallation of a sales package may be carried out by either deleting the complete package from the HDD 15 or deleting only the access information of the sales package.

The sales P information updating part 86 updates the function package information 75 with respect to the received function packages 1, 2, and 5. Namely, the "activation purchase P number" of each of the function packages 1, 2, and 5 is decremented, and the "activation column" of the function package 5 the "activation purchase P number" of which is equal to zero is set to "x".

The starting information updating part 92 makes reference to the function package information 75, and deletes from the starting information 77 the function package 5 the "activation column" of which is newly set to "x". Hence, at the next time the image forming device 100 is started, the function package 5 will not be started.

In the sales package information 74: "activation column" of sales package A="x", "activation column" of sales package B="O", "activation column" of sales package C="O", and "activation column" of sales package D="x".

In the function package information 75: "activation purchase P number" of function package 1="1", "activation column" of function package 1="O", "activation purchase P number" of function package 2="1", "activation column" of function package 2="O", "activation purchase P number" of function package 3="1", "activation column" of function package 3="O", "activation purchase P number" of function package 4="1", "activation column" of function package 4="O", "activation purchase P number" of function package 5="O", and "activation column" of function package 5="x".

In this embodiment, the expiration date is set in the sales package, and if the expiration date is exceeded, the sales package is automatically uninstalled. Hence, it is possible to provide a use license of a sales package with a time limit.

Next, another embodiment of the invention will be described. When different expiration dates are set in a plurality of sales packages, the different expiration dates are registered in the function packages which overlap over two or more sales package. In such a case, uninstallation of a sales package may be performed by expiration of an expiration date. Alternatively, only starting of the function packages in the sales package may be inhibited without uninstalling the sales package.

FIG. 15A and FIG. 15B are diagrams illustrating an example of the sales package information 74 in which an expiration date is registered.

As illustrated in FIG. 15A, the expiration date "1/11" is specified in the sales package A, the expiration date "2/22" is specified in the sales package B", the expiration date "3/24" is specified in the sales package C, and the expiration date "4/1" is specified in the sales package D, respectively.

In this embodiment, in order to manage the expiration dates of the respective sales packages, an expiration date list is provided in the function package information 75 as illustrated in FIG. 15B. An expiration date list of a function package contains a list of expiration dates of all the sales packages including that function package.

Hence, in the function package information 75 of FIG. 15B, the expiration date list of function package 1 contains "1/11", "2/22" and "4/1", the expiration date list of function package 2 contains "1/11" and "3/24", and the expiration date list of function packages 4 contains "3/24" and "4/1".

Figure 16B:
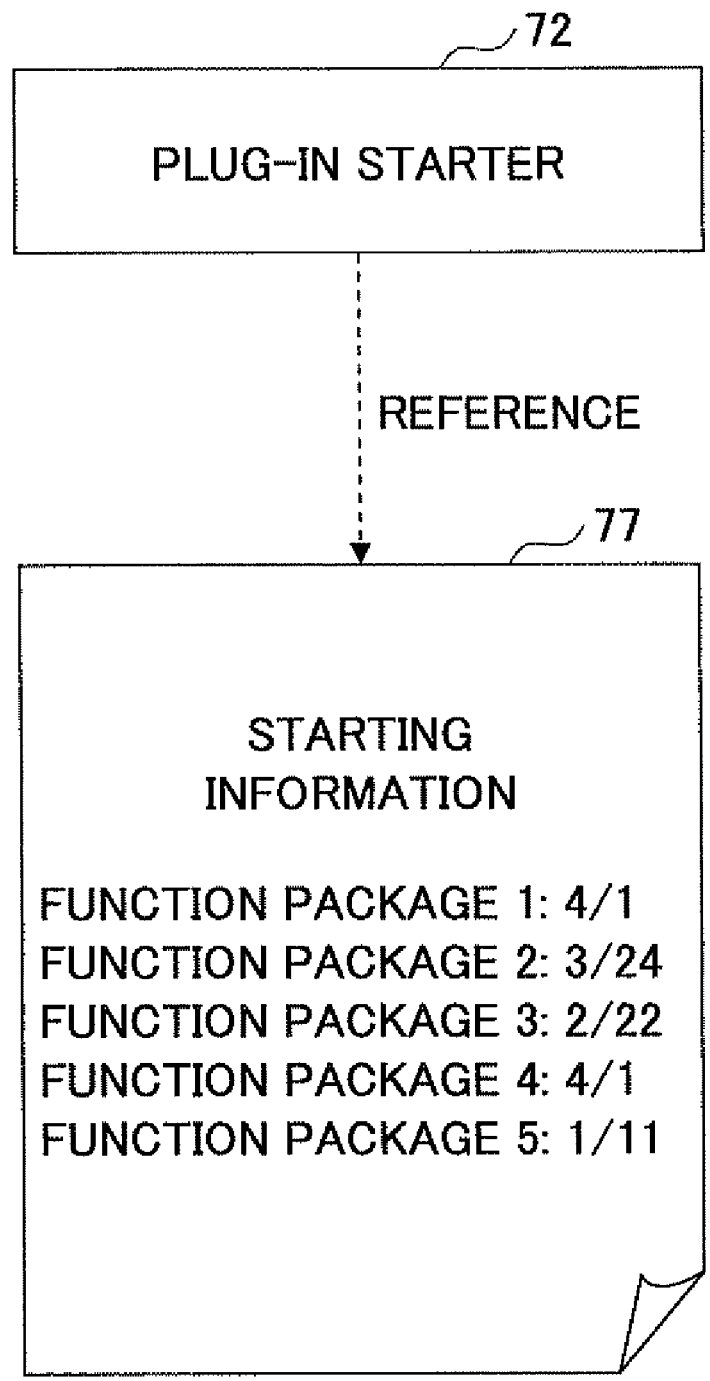

FIG. 16A is a diagram for explaining the relationship between sales packages and function packages when a function package includes a plurality of expiration dates. FIG. 16B is a diagram illustrating an example of the starting information 77.

In this embodiment, when a function package has a plurality of expiration dates, the starting information updating part 92 associates the function package with the latest expiration date among the plurality of expiration dates, and registers the function package associated with the latest expiration date in the starting information 77.

Hence, as illustrated in FIG. 16B, the expiration date list of function package 1 is "4/1", the expiration date list of function package 2 is "3/24", and the expiration date list of function package 4 is "4/1".

At the time the image forming device 100 is started, the plug-in starter 72 compares each expiration date of the starting information 77 with the current date/time acquired from the system clock of the image forming device 100, and does not start the function package the expiration date of which precedes the current date/time.

Therefore, in this embodiment, an expiration date is specified in each function package, and if the expiration date is exceeded, starting of the function package is inhibited, without uninstalling the sales package.

Next, another embodiment of the invention will be described. There is also a case in which no expiration date is set in a certain sales package.

Figure 17B:
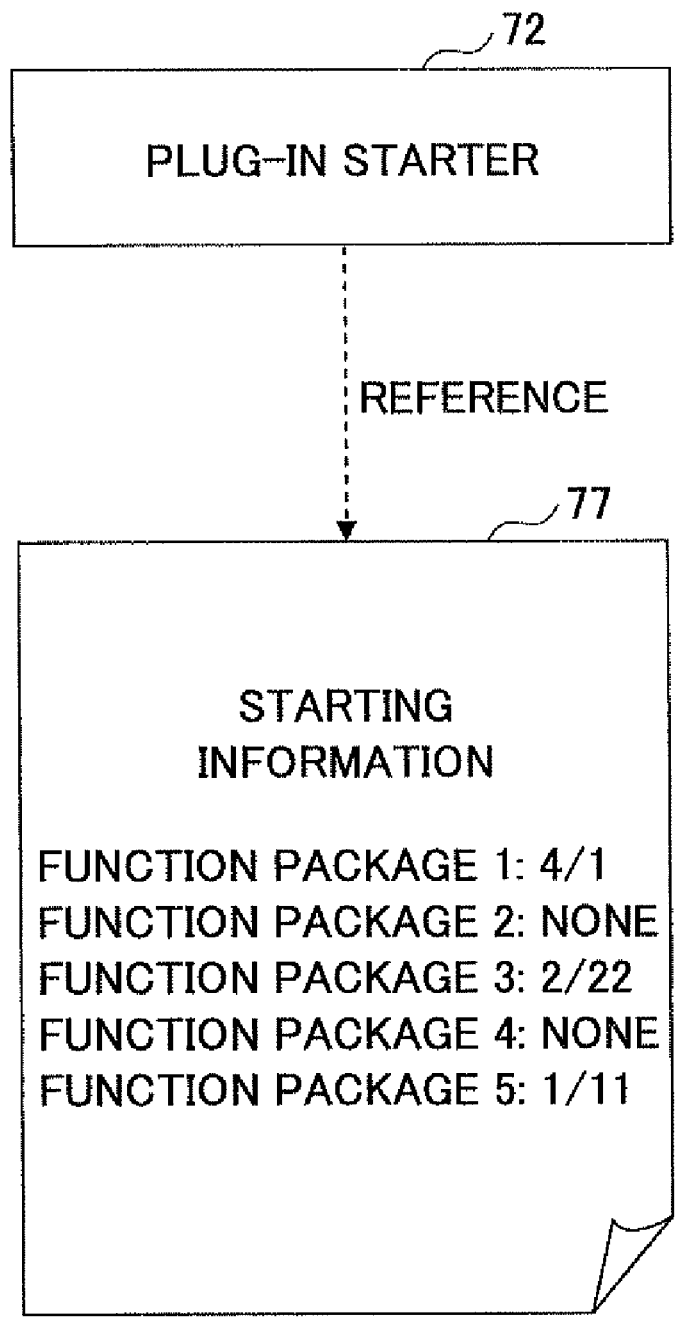

FIG. 17A is a diagram for explaining the relationship between sales packages and function packages when no expiration date is set in a certain sales package. FIG. 17B is a diagram illustrating an example of the starting information 77.

When both a sales package with one or more expiration dates and a sales package without an expiration date exist, the starting information updating part 92 gives priority to the sales package without an expiration date, associates each of function packages in the priority sales package with "none" item (no expiration date), and registers them in the starting information 77 as illustrated in FIG. 17B.

Figure 18:
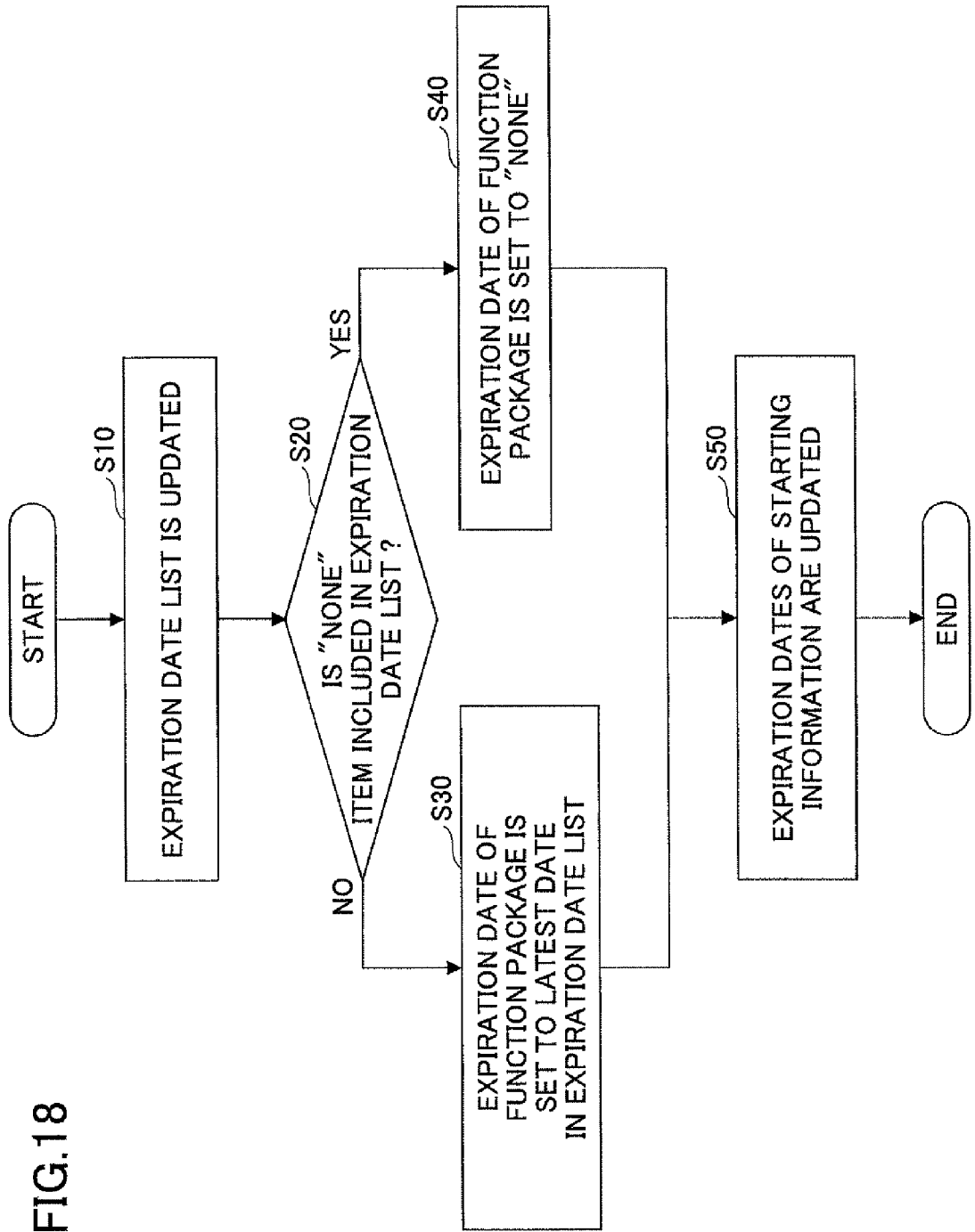
FIG. 18 is a flowchart for explaining a control procedure to set an expiration date in starting information by the image forming device of an embodiment of the invention.

FIG. 18 is a flowchart for explaining a control procedure to set an expiration date in the starting information 77 by the image forming device of an embodiment of the invention.

If an expiration date of a sales package is updated, the function P information updating part 87 updates the expiration date list of each of function packages in the sales package (S10). In this embodiment, the "none" item is contained in some of the expiration date lists of the function packages.

Subsequently, the starting information updating part 92 determines whether the current expiration date list which contains the "none" item exists (S20). When no "none" item is included in the expiration date list (No in S20), the starting information updating part 92 sets the expiration date of each function package to the latest expiration date among the respective expiration dates of the expiration date list (S30).

When the "none" item is included in the expiration date list (Yes in S20), the starting information updating part 92 sets the expiration date of the function package to "none" (S40).

Subsequently, the starting information updating part 92 updates a corresponding expiration date of the starting information 77 for each function package by using the set-up expiration date (S50).

Consequently, the expiration date list of function package 2 contains "1/11" and "none", and the expiration date list of function package 4 contains "none" and "4/1", as in the example of FIG. 17A. In this case, the starting information updating part 92 sets the expiration date of each of the function packages 2 and 4 in the starting information 77 to "none", respectively.

In this embodiment, when no expiration date is set in a certain sales package, an expiration date is not set up for each of the function packages included in the sales package. Such setting is useful for a plug-in component 73 which is configured provide a fundamental function.

Next, another embodiment of the invention will be described. In this embodiment, the updating of an expiration date of the starting information is performed by a newly activated sales package. When activation of a sales package is newly performed, an expiration date of a function package included in common in the sales package and another sales package which is previously activated may vary.

Figure 19A:
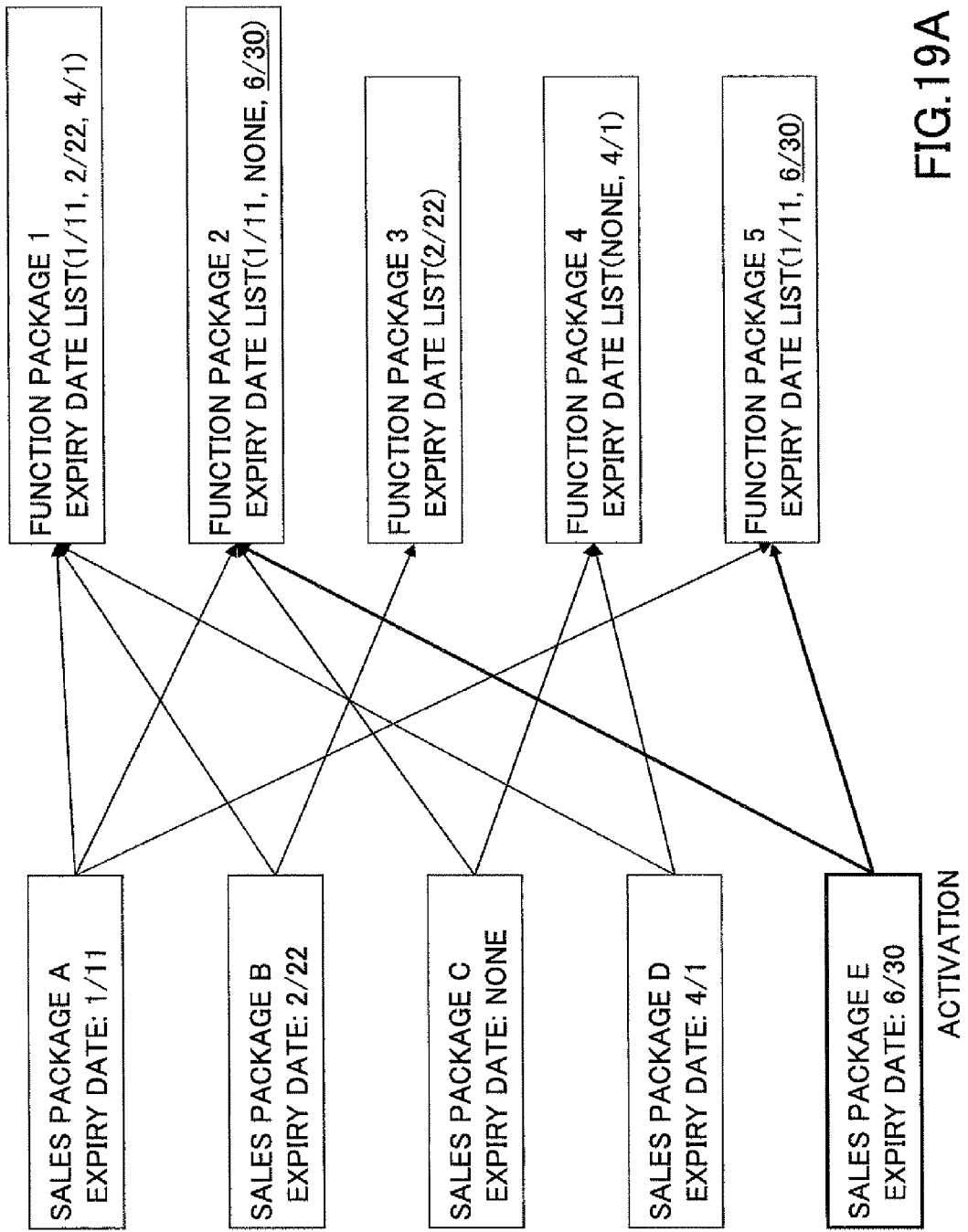
FIG. 19A and FIG. 19B are diagrams for explaining the relationship between sales packages and function packages when an expiration date is updated by a newly activated sales package.
Figure 19B:
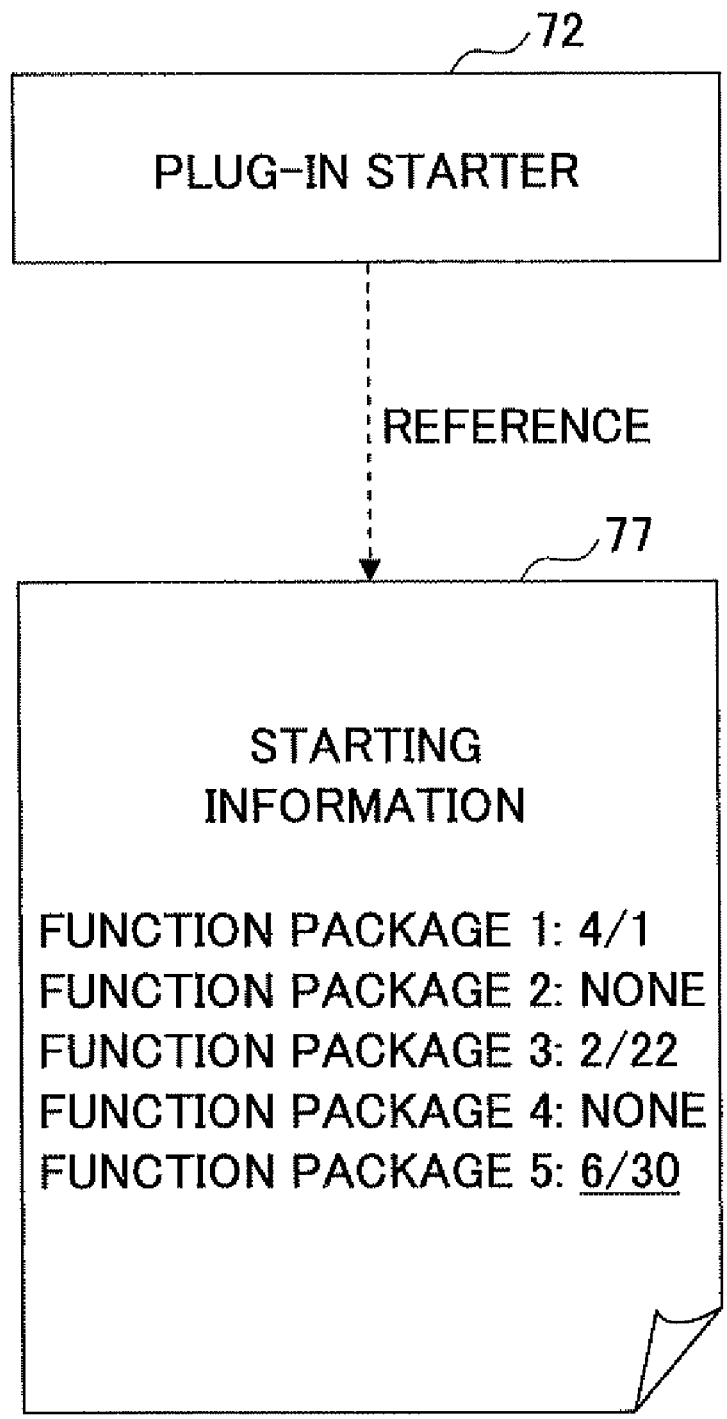

FIG. 19A is a diagram for explaining the relationship between sales packages and function packages when an expiration date is updated by a newly activated sales package. FIG. 19B is a diagram illustrating an example of the starting information 77.

FIG. 19A illustrates the state of the sales packages and the function packages in which activation of a sales package E is newly performed from the state of FIG. 17A. An expiration date of the sales package E is "6/30", and the sales package E contains the function packages 2 and 5.

In this case, the starting information updating part 92 updates an expiration date of each of the function packages 2 and 5 in the starting information 77 if needed.

Similar to the previous embodiment of FIG. 17A, among the expiration dates of the function packages in the starting information 77, priority is given to the function package with the "none" item. Because the expiration date list of function package 2 which is included in each of the sales package A, C, and E contains "1/11", "none" and "6/30", the expiration date of function package 2 in the starting information 77 remains unchanged ("none") even after activation of the sales package E is performed.

On the other hand, the expiration date list of function package 5 which is included in each of the sales packages A and E contains "1/11" and "6/30", and after activation of the sales package E is performed, the expiration date of function package 5 in the starting information 77 is changed to "6/30".

In this manner, the starting information updating part 92 updates an expiration date of the starting information 77 when activation of the sales package with an expiration date is performed.

Similarly, the updating of an expiration date of the starting information 77 which is performed by uninstallation of a sales package with an expiration date will be explained.

Figure 20A:
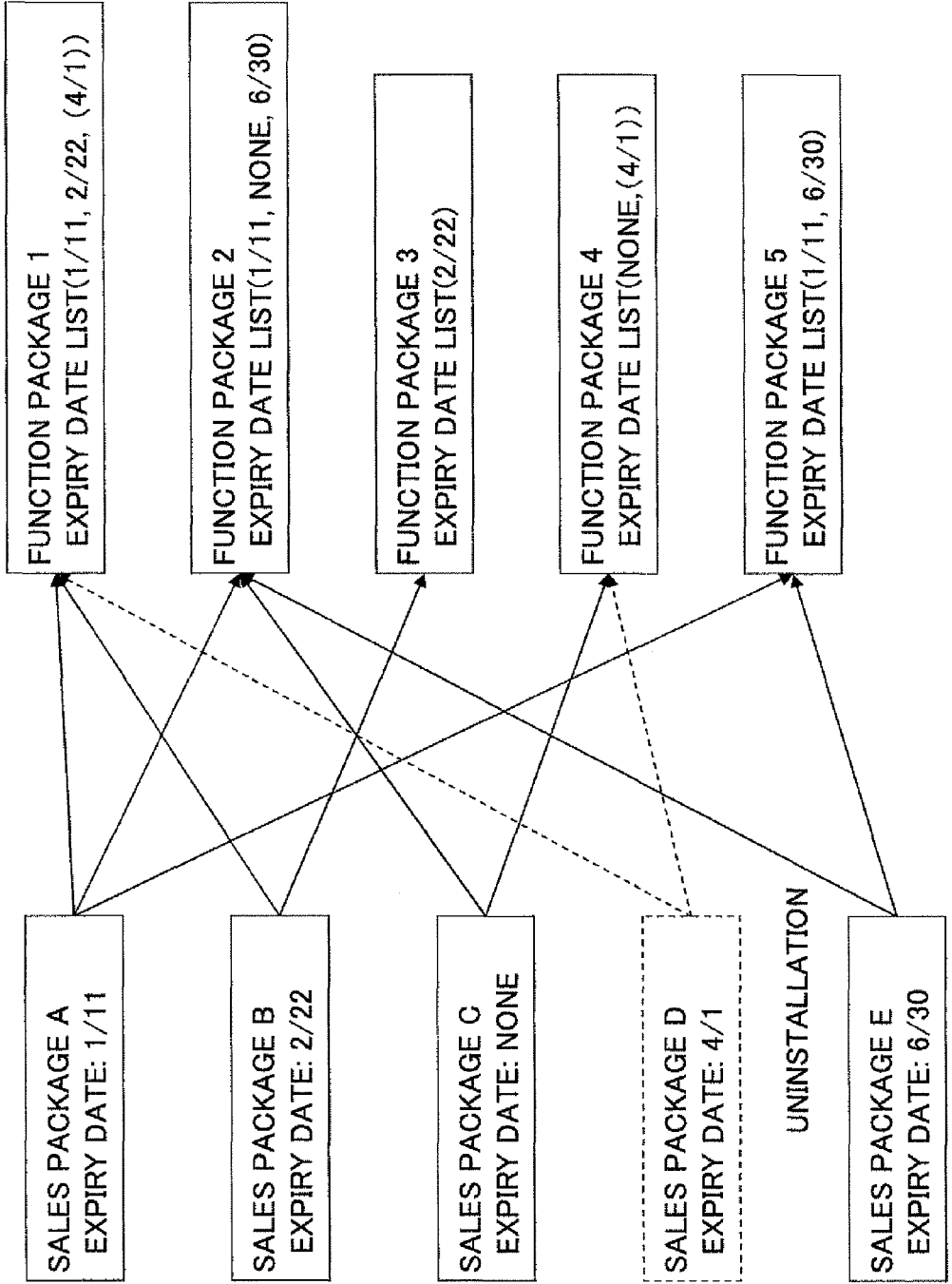
FIG. 20A and FIG. 20B are diagrams for explaining the relationship between sales package and function packages when a certain sales package is uninstalled.
Figure 20B:
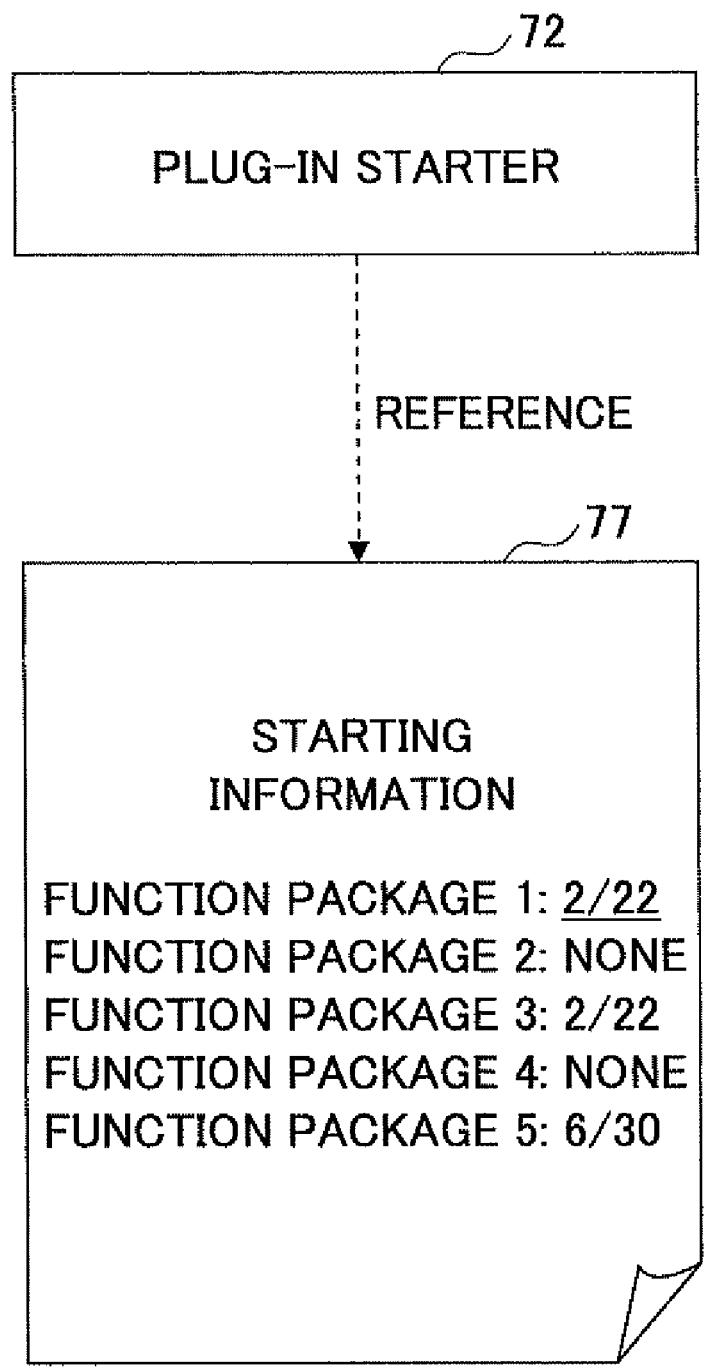

FIG. 20A is a diagram for explaining the relationship between sales packages and function packages when the sales package D is uninstalled from the state of FIG. 19A. FIG. 20B is a diagram illustrating an example of the starting information 77.

The sales package D which is uninstalled includes the function packages 1 and 4, and the starting information updating part 92 updates an expiration date of each of the function packages 1 and 4 in the starting information 77, if needed.

By uninstallation of the sales package D, the expiration date list of function package 1 which is included in each of the sales package A, B, and D is changed from the list of "1/11", "2/22" and "4/1" to the list of "1/11" and "2/22". Hence, the starting information updating part 92 changes the expiration date of function package 1 to "2/22".

The expiration date list of function package 4 which is included in each of the sales packages C and D is changed from the list of "none" and "4/1" to "none" by uninstallation of the sales package D. In this case, the expiration date of the function package 4 in the starting information 77 remains unchanged ("none") even after uninstallation of the sales package D is done. Hence, the starting information updating part 92 does not change the expiration date of the function package 4 in the starting information 77.

Next, the updating of an expiration date of the starting information 77 which is performed when an expiration date of a sales package in an activated state is updated will be described. It is assumed that an expiration date of the sales package A in an activated state is changed from "1/11" to "7/31".

Figure 21A:
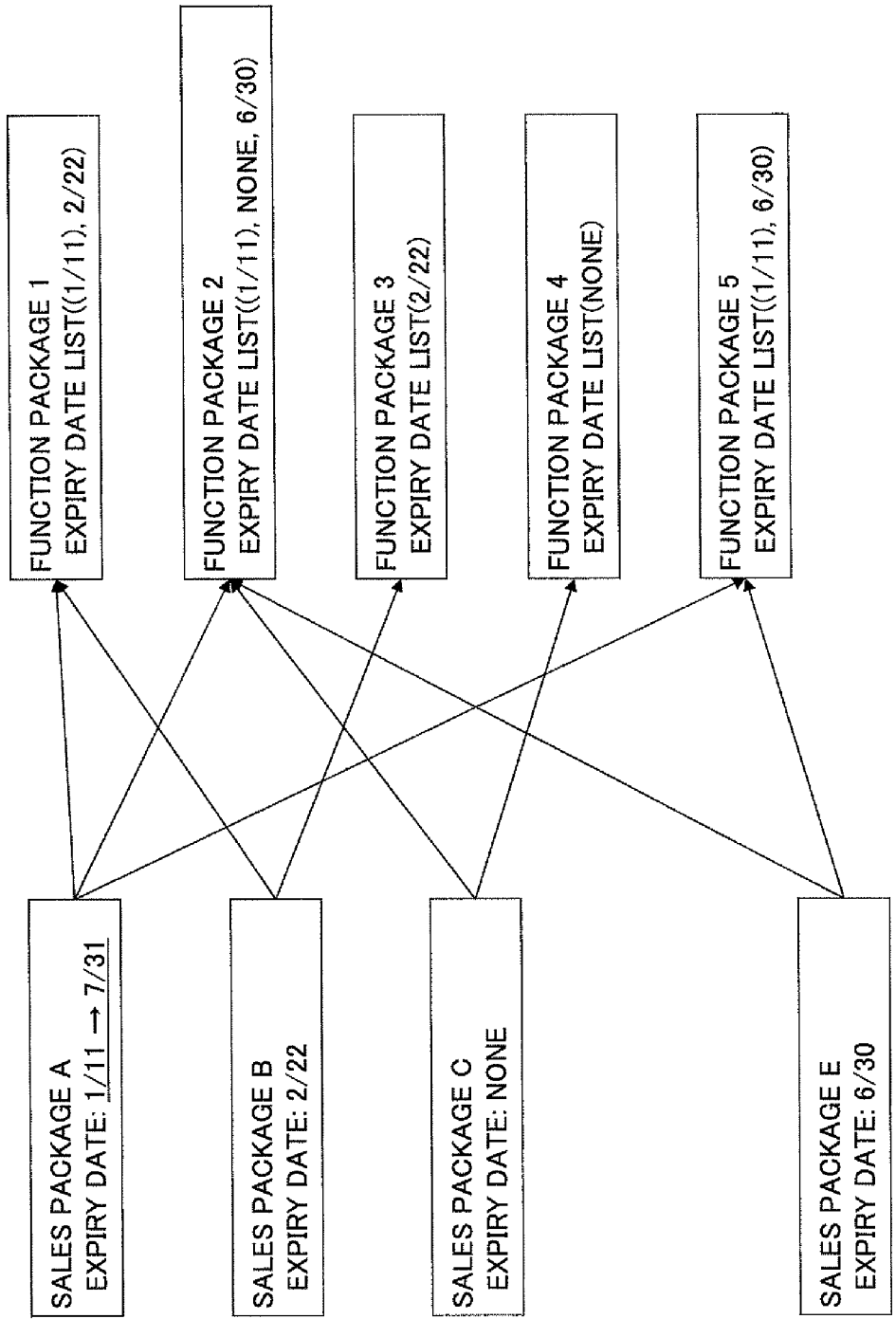
FIG. 21A and FIG. 21B are diagrams for explaining the relationship between sales package and function packages in the process of updating of an expiration date of a sales package.
Figure 21B:
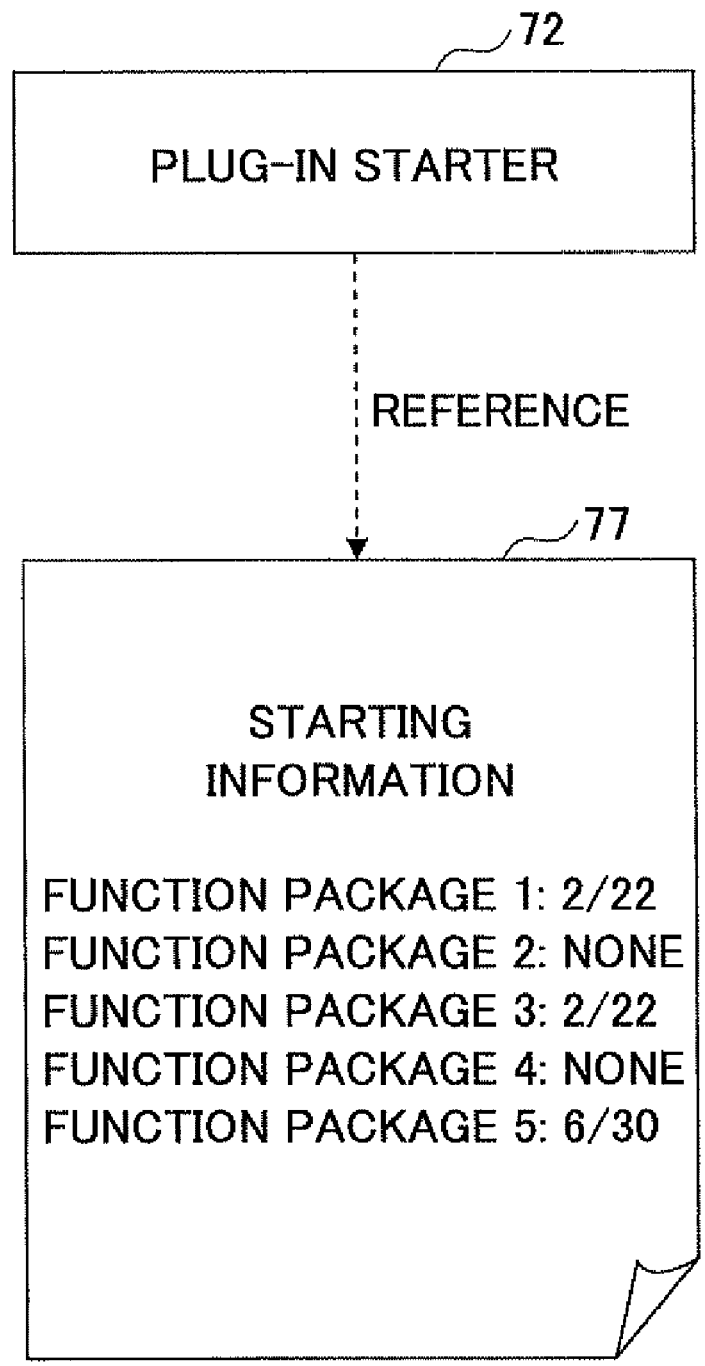

FIG. 21A is a diagram which illustrates the relationship between sales packages and function packages in the process of updating of an expiration date of the sales package A. FIG. 213 illustrates an example of the starting information 77.

When updating an expiration date of a sales package, the function P information updating part 87 temporarily deletes the expiration date before the updating from the expiration date list, and then registers a new expiration date into the expiration date list.

In the example of FIG. 21A, the expiration date list of function package 1 which is included in each of the sales packages A and B contains "1/11" and "2/22". When the expiration date of the sales package A is updated, the function P information updating part 87 temporarily deletes "1/11" from the expiration date list. Hence, the expiration date list of function package 1 contains only "2/22" temporarily.

Similarly, the expiration date list of function package 2 which is included in each of the sales package A, C, and E contains "1/11", "none" and "6/30". When the expiration date of the sales package A is updated, the function P information updating part 87 temporarily deletes "1/11" from the expiration date list. Hence, the expiration date list of function package 2 contains only "none" and "6/30" temporarily.

Similarly, the expiration date list of function package 5 which is included in each of the sales packages A and E contains "1/11" and "6/30". When the expiration date of the sales package A is updated, the function P information updating part 87 temporarily deletes "1/11" from the expiration date list. Hence, the expiration date list of function package 5 contains only "6/30" temporarily.

Subsequently, the function P information updating part 87 registers the new expiration date of the sales package A after the updating in the expiration date list of each of the function packages. In this example, the new expiration date of the sales package A after the updating is "7/31".

Figure 22A:
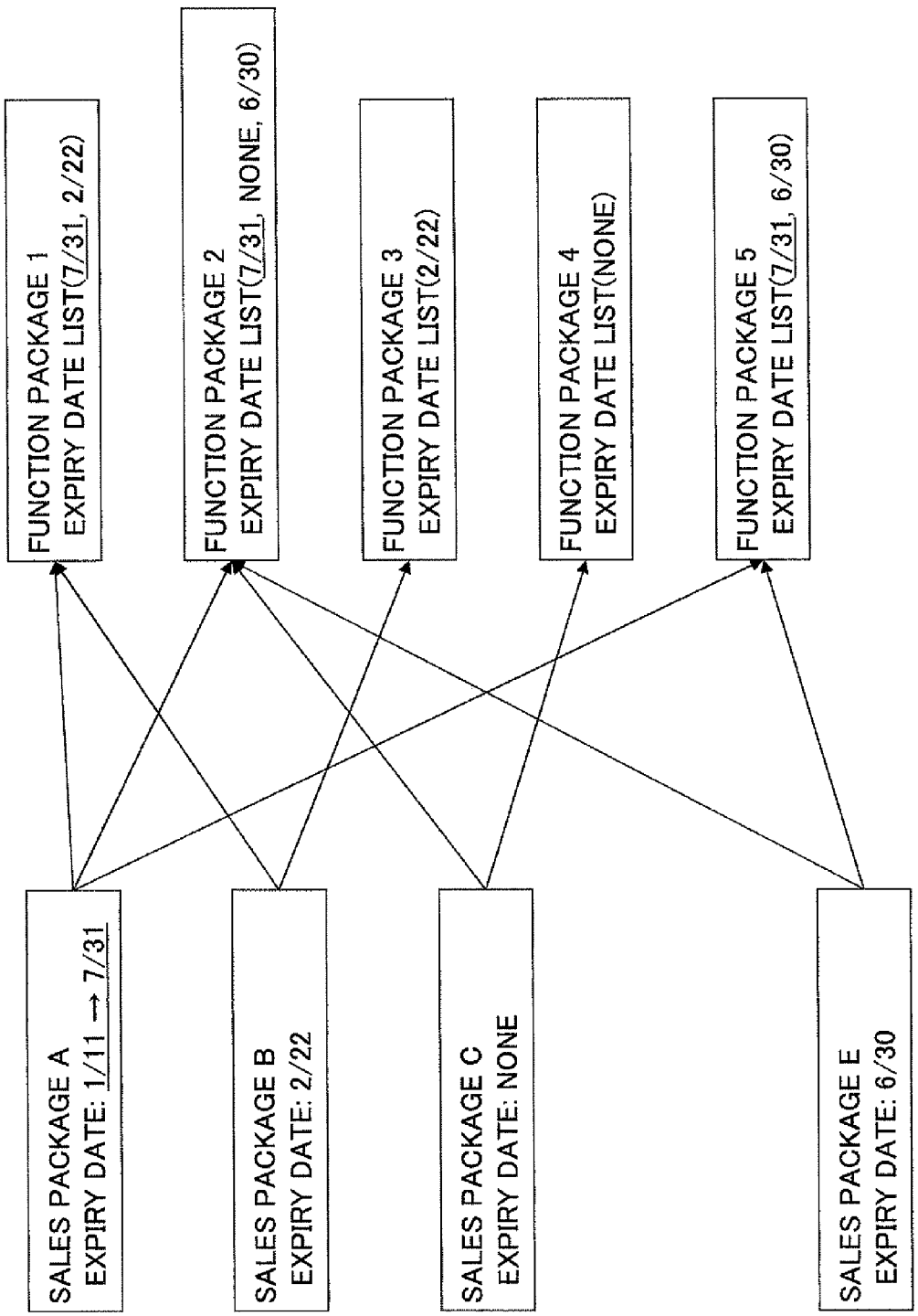
FIG. 22A and FIG. 22B are diagrams for explaining the relationship between sales package and function packages after the updating of the expiration date of the sales package is done.
Figure 22B:
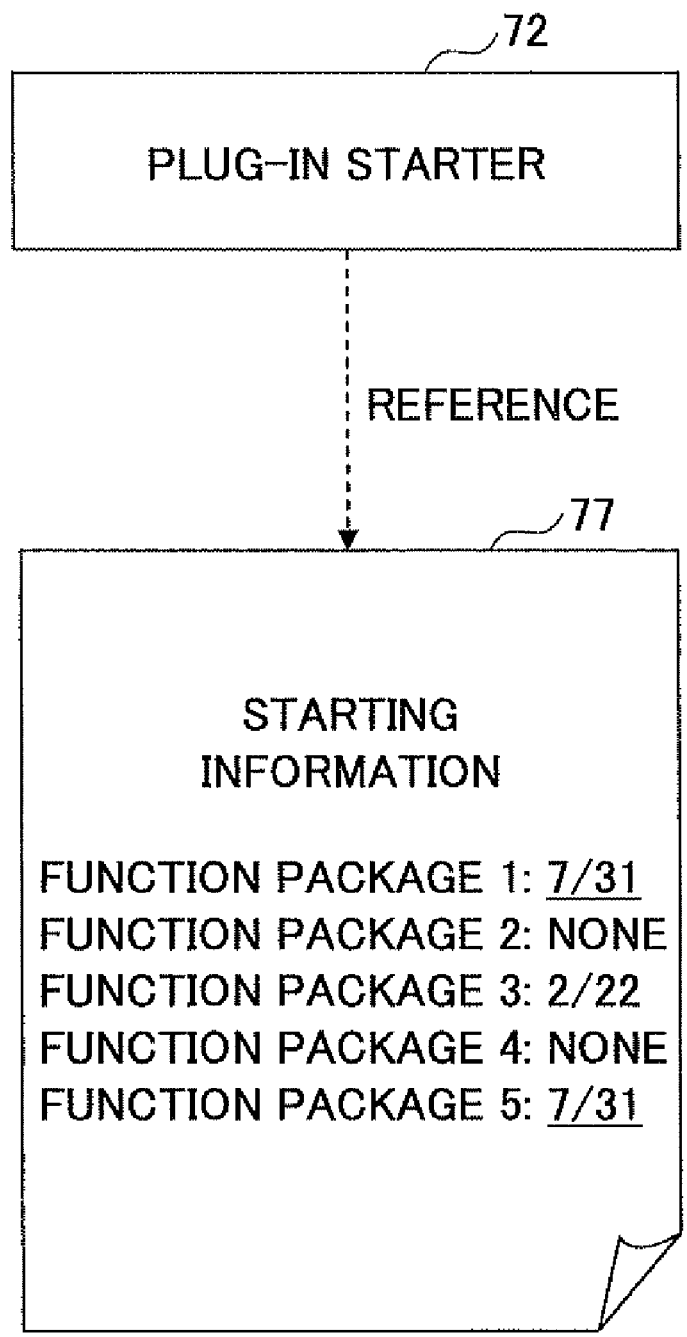

FIG. 22A is a diagram for explaining the relationship between sales packages and function packages after the updating of the expiration date of the sales package A is done. FIG. 22B is a diagram illustrating an example of the starting information 77.

The function P information updating part 87 adds "7/31" to the expiration date list of function package 1, and the updated expiration date list of function package 1 contains "7/31" and "2/22". Because the starting information updating part 92 sets the latest one among the expiration dates in the expiration date list of function package 1 to the starting information 77, the starting information updating part 92 updates an expiration date of function package 1 in the starting information 77 to "7/31".

Similarly, the function P information updating part 87 adds "7/31" to the expiration date list of function package 2, and the updated expiration date list of function package 2 contains "7/31", "none", and "6/30". Because the starting information updating part 92 gives priority to the function package with the "none" item among the expiration dates in the expiration date list of function package 2 in the starting information 77, the starting information updating part 92 does not update the expiration date of function package 2 in the starting information 77 (which is still "none").

The function P information updating part 87 adds "7/31" to the expiration date list of function package 5, and the updated expiration date list of function packages 5 contains "7/31" and "6/30". Because the starting information updating part 92 sets the latest one among the expiration dates in the expiration date list of function package 5 to the starting information 77, the starting information updating part 92 updates the expiration date of function package 5 to "7/31".

In this embodiment, if an expiration date of a sales package is updated, the updated expiration date is made to reflect in the expiration date of each function package included in the sales package, and each function package can be started unless the expiration date is exceeded.

Next, an example of management of activation performed by the image forming device of an embodiment of the invention will be described.

As described above, the plug-in management part 71 stores the license file 76 and the lock code with the association of the license file 76 and the lock code. In this embodiment, the lock code stored in the license file 76 is compared with the lock code specific to the image forming device 100, and it is determined whether the license file 76 is correctly the license file specific to the image forming device 100. The plug-in management part 71 of this embodiment performs the comparison and determination process at the time the activation process is started, and when the license file 76 is authenticated normally, the plug-in management part 71 of this embodiment permits one of activation, deactivation, installation, and uninstallation to be performed.

Figure 23:
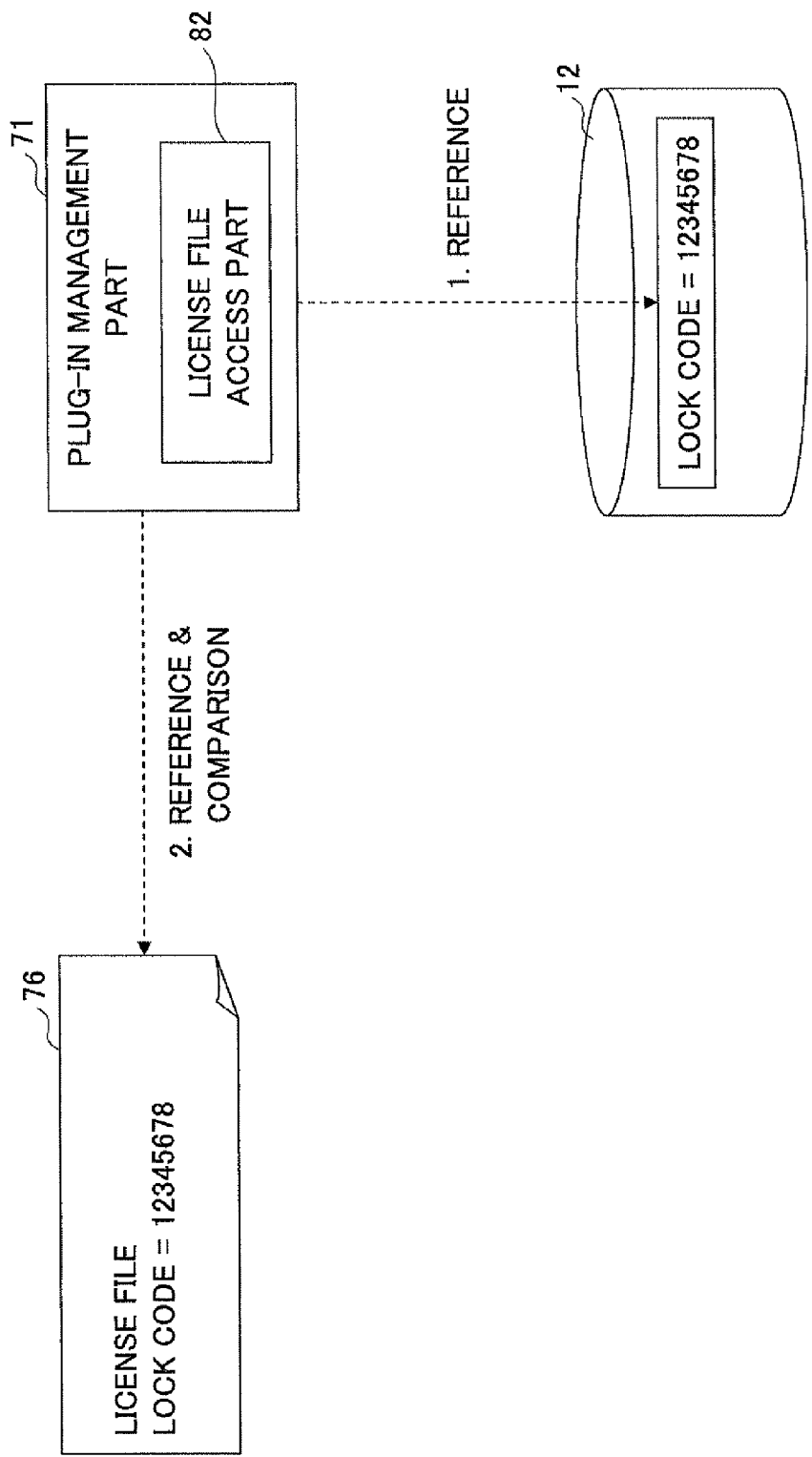
FIG. 23 is a diagram for explaining verification of a license file using a lock code.

FIG. 23 is a diagram for explaining the verification of the license file 76 using a lock code.

As illustrated in FIG. 23, the plug-in management part 71 reads out the lock code from the system memory MEM-P 12 of the image forming device 100 (1. Reference)

Next, the license file access part 82 reads out the lock code stored in the license file 76 from the HDD 15. The plug-in management part 71 of this embodiment performs the comparison and determination process described above (2. Reference & Comparison). Only when both the lock codes are in agreement, the activation control part 84 permits the activation or deactivation, including the updating of the sales package information 74, the function package information 75, and the starting information 77.

In this embodiment, it is possible to prevent the activation of program components in another image forming device which is illegally performed by using the license file 76 copied from the image forming device 100, and it is possible to improve security of the license file 76.

Next, an example of management of an expiration date of a service package using an expiration date of a license file, performed by the image forming device of an embodiment of the invention will be described.

In this embodiment, the management of an expiration date of a sales package is performed by associating the expiration date of the sales package and an expiration date of a license file 76.

As described above, an "expiration date" can be set in a license file 76, the "expiration date" of the license file 76 is set to the expiration date of the sales package.

Figure 24:
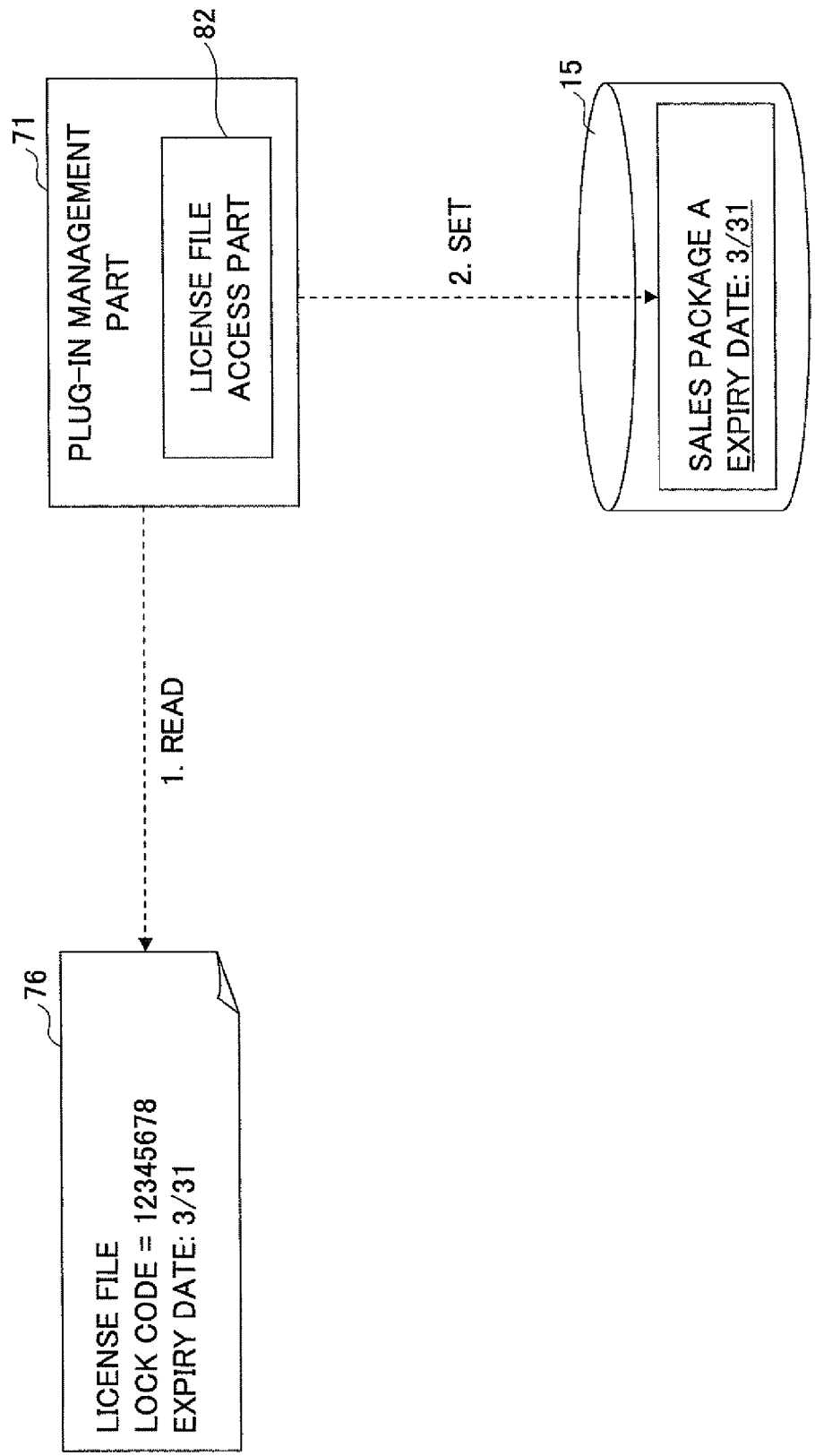
FIG. 24 is a diagram for explaining setting of an expiration date in a sales package using an expiration date of a license file.

FIG. 24 is a diagram for explaining the setting of an expiration date in a sales package using an expiration date of the license file 76.

As illustrated in FIG. 24, the plug-in management part 71 (or the license file access part 82) reads out an expiration date of the license file 76 (1. Read) In this example, the expiration date of the license file 76 is "3/31".

Subsequently, the sales P information updating part 86 sets the "expiration date" of the sales package information 74 to "3/31" (2. Set).

Thereby, "3/31" is added to the expiration date list of each of the function packages included in the sales package. Because the starting information updating part 92 can update the starting information 77, if needed, management of an expiration date of the license file 76 and the sales package can be performed in a uniform manner.

Next, an example of management of an expiration date of a service package using a validity period, performed by the image forming device of an embodiment of the invention will be described.

There is a case where it is desired to designate an expiration date of a sales package by a predetermined validity date. For example, if an expiration date is set up at the time of shipment, a time lag between the shipment and the activation may arise, which causes inconvenience to the user.

To avoid the problem, the image forming device 100 of this embodiment is arranged to set up an expiration date of a sales package by a predetermined validity period.

The validity period may be registered in the license file 76. Alternatively, the validity period may be directly input by the user from the operation panel 24. Alternatively, a date/time which is, for example, one year later from the date of activation or the date of installation may be automatically set as the validity period by the activation control part 84.

In this embodiment, the validity period is registered in the license file 76.

Figure 25:
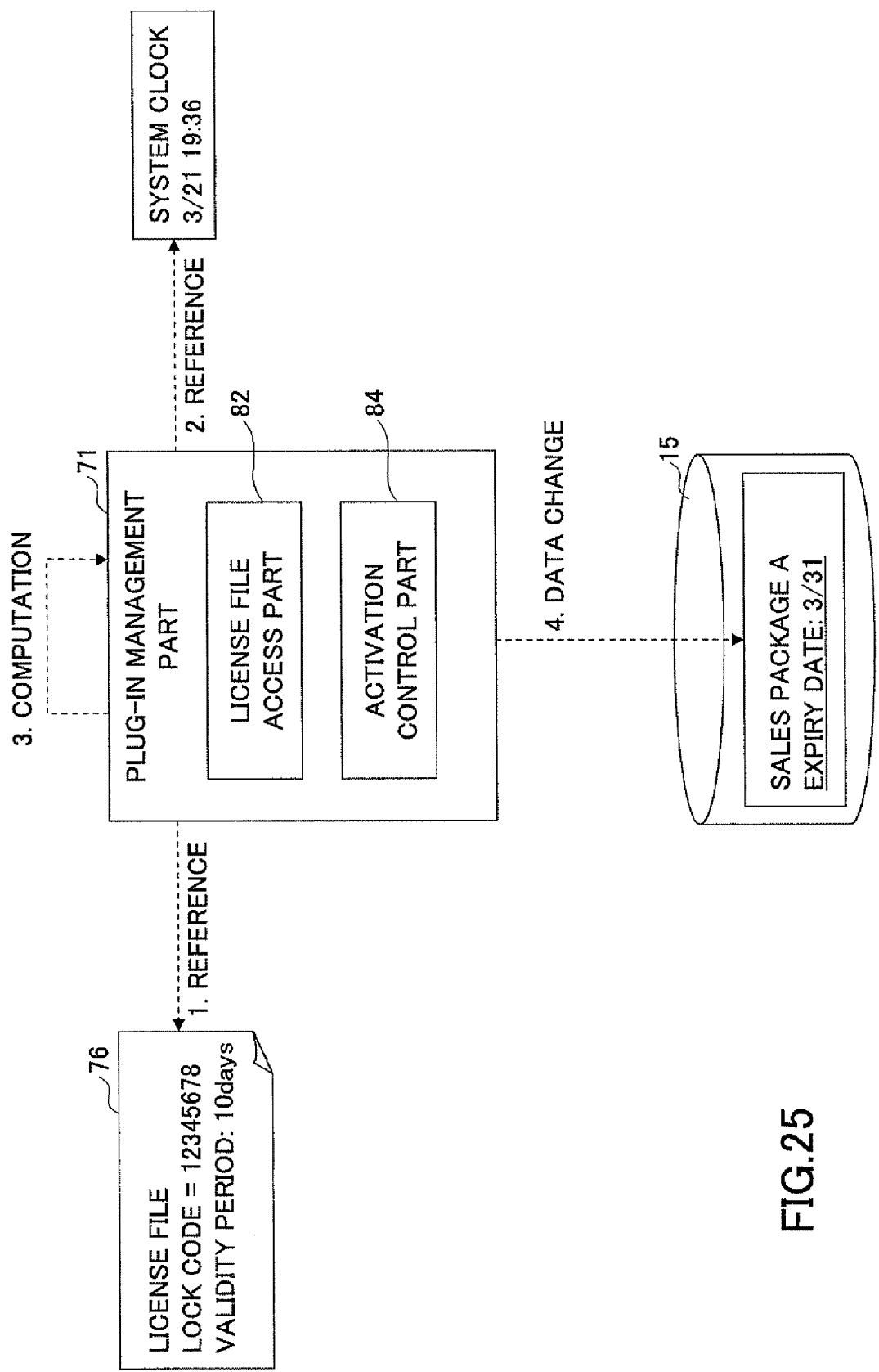
FIG. 25 is a diagram for explaining setting of an expiration date in a sales package using a validity period.

FIG. 25 is a diagram for explaining the setting of an expiration date in a sales package using a validity period.

As illustrated in FIG. 25, the license file access part 82 reads out a "validity period" registered in the license file 76 (1. Reference) The validity period in this example is set to "10 days".

Next, the activation control part 84 reads out the current date/time from the system clock of the image forming device 100 (2. Reference).

Next, the activation control part 84 adds the validity period "10 days" to the acquired current date/time (3. Computation). The computed date/time is set to an expiration date of the sales package A.

Next, the sales P information updating part 86 sets the computed date/time in the sales package information 74 (4. Data Change).

Subsequently, the function P information updating part 87 uses this expiration date of the sales package A in the expiration date list of each of the function packages in the sales package A, and the starting information updating part 92 updates an expiration date of the starting information 77, if needed. Therefore, it is possible to prevent the time lag between the shipment and the activation from arising, thereby improving the convenience to the user.

Next, an example of reminding a user of an expiration date performed by the image forming device of an embodiment of the invention will be described.

In the previous embodiment, the plug-in starter 72 does not start the function package if the expiration date is exceeded. If the user is notified prior to the expiration date that the expiration date is approaching, the user can understand that the expiration date will be reached.

In this embodiment, a date which is earlier than an expiration date by a predetermined period (called a remaining activation period) is set as the reminding date. Because the expiration date is set in the sales package information 74, the reminding date may be registered in the sales package information 74. Alternatively, the reminding date may be registered in the HDD 15 independently.

Without setting the reminding date in the sales package information 74, the determination as to whether the current date/time is earlier than the expiration date by the remaining activation period may be made each time the image forming device 100 is started.

Figure 26:
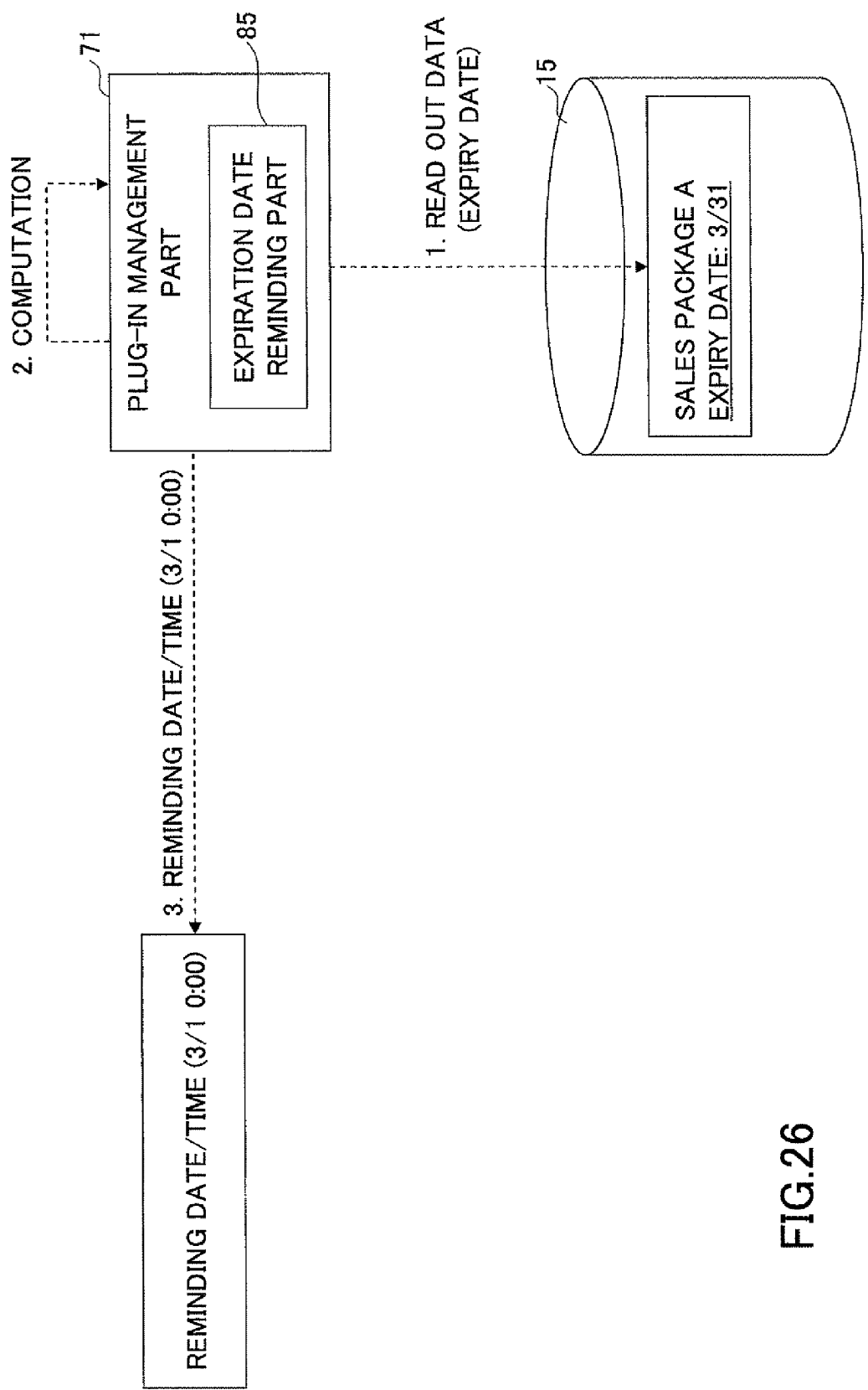
FIG. 26 is a diagram for explaining reminding of an expiration date.

FIG. 26 is a diagram for explaining the reminding of an expiration date.

As illustrated in FIG. 26, the expiration date reminding part 85 makes reference to the sales package information 74 and reads out an expiration date (1. Read Out Data).

Next, the expiration date reminding part 85 subtracts the remaining activation period from the expiration date (2. Computation).

Next, the expiration date reminding part 85 determines the reminding date (3. Reminding Date/Time). In the example of FIG. 26, the remaining activation period is set to "30 days (about one month)".

For example, if the expiration date of the sales package is "3/31" and the remaining activation period is subtracted from the expiration date, the reminding date is determined as being "3/1". If the reminding date "3/1" is reached, the reminding of the expiration date to the user is performed. For this purpose, the reminding date/time may be set exactly to "0:00 a.m. of 3/1".

The expiration date reminding part 85 registers the reminding date in the sales package information 74 so that the reminding date is stored. Because an expiration date is set up for each sales package, the reminding date is also registered for each sales package (which is stored with the association of the reminding date and the sales ID of the sales package).

The expiration date reminding part 85 may store as a constant the remaining activation period. Alternatively, the remaining activation period may be directly input by the user from the operation panel 24. When the user sets up the remaining activation period, the remaining activation period is stored in the HDD 15.

Figure 27:
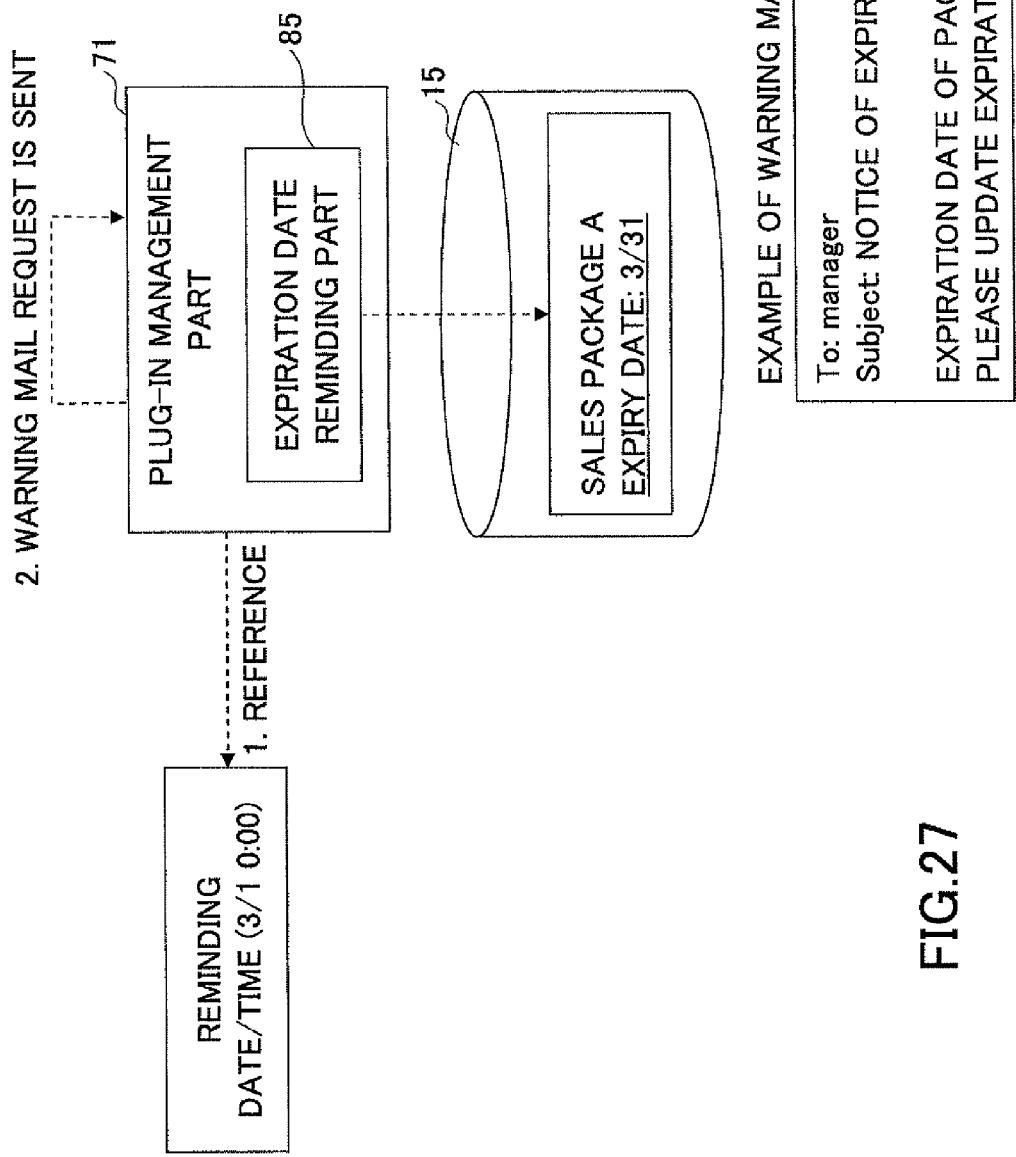
FIG. 27 is a diagram for explaining notification using a reminding date/time.

FIG. 27 is a diagram for explaining notification using a reminding date/time.

As illustrated in FIG. 27, the expiration date reminding part 85 compares the reminding date/time with the current date/time acquired from the system clock, and detects whether the current date/time reaches the reminding date/time (1. Reference).

Next, the expiration date reminding part 85 sends a warning mail request so that a warning mail is created and transmitted (2. Warning Mail Request Is Sent).

In the warning mail, the expiration date is included in order to improve the convenience to the user. For this purpose, the expiration date reminding part 85 reads out from the sales package information 74 an expiration date of the sales package with which the reminding date is reached.

The expiration date reminding part 85 reads out from the HDD 15 an "e-mail address of the user (or the administrator of the image forming device 100)", a "subject name", and a "text" which are stored beforehand therein. The expiration date reminding part 85 adds the expiration date and the name of the sales package, read from the sales package information 74, to the expiration date item in the text. The expiration date reminding part 85 sends these information items to the e-mail application 49, and the e-mail application 49 transmits the warning mail according to the communication protocol, such as SMTP, via the NIC 18.

An example of the warning mail is illustrated in FIG. 27. This warning mail depicts that the expiration date of "sales package "AAA" is 3/31 and that the updating of the expiration date before that date is requested. Alternatively, the warning mail may depict that the expiration date of sales package "AAA" will be reached in 30 more days". In this case, the remaining activation period is notified to the user.

In this embodiment, the user is notified of the expiration of a service package before the expiration date is exceeded, thereby improving the convenience to the user.

The warning mail may be transmitted on the reminding date at a particular time. After the reminding date is reached, the warning mail may be transmitted at intervals of a given period (for example, in every week). The frequency of transmitting the warning mail may be increased as the expiration date is approaching.

Next, an example of determination of execution of activation performed by the image forming device of an embodiment of the invention will be described.

In this embodiment, the current date/time is compared with the date of creation of the license file 76, and it is determined whether activation is performed. When the current date/time from the system clock of the image forming device 100 is earlier than the date of creation of the license file 76 by a predetermined time, the activation is determined as a failure. Even if the contract term is defined by an expiration date, the service package may be illegally used beyond the expiration date by slowing the system clock of the image forming device 100. This embodiment is adapted to avoid the problem.

As described above, the license file 76 is created by the license server 200, and the date the license file 76 is created by the license server 200 is the date of creation of the license file 76. Because the date/time of the license server 200 is periodically maintained with the NTP server, the date/time may be considered the exact date/time. Usually, the date/time at which the activation is performed using the license file 76 follows the date of creation of the license file 76.

For this reason, there is no possibility that the date/time at which the activation is performed precedes the date of creation of the license file 76. In other words, if the system clock of the image forming device 100 is earlier than the date of creation of the license file 76, it is highly possible that the user altered the system clock of the image forming device 100 intentionally, in order to illegally use the plug-in component beyond the contract term.

In this embodiment, if the current date/time of the system clock is detected as being earlier than the date of creation of the license file 76, the date/time comparing part 81 requests the activation control part 84 to inhibit the activation. The date/time comparing part 81 transmits a message indicating that the system clock of the image forming device 100 should be corrected, to the user who has requested the activation.

Figure 28:
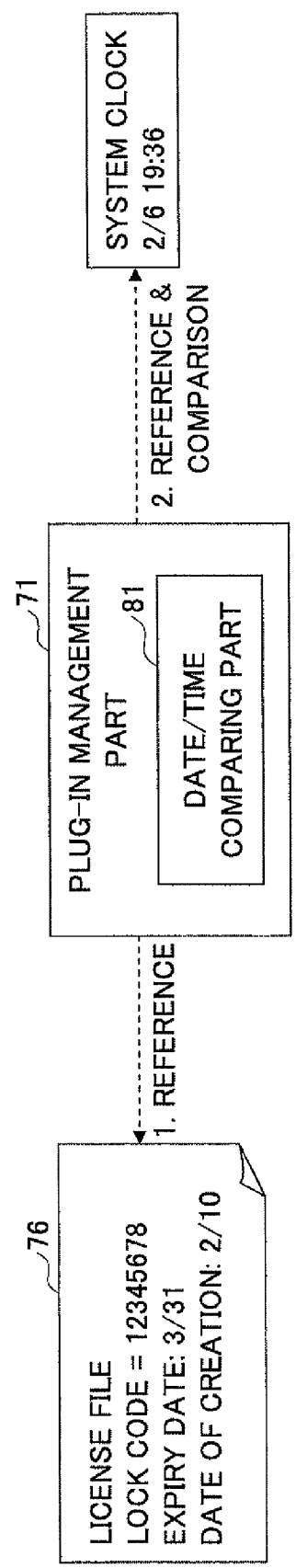
FIG. 28 is a diagram for explaining determination of execution of activation which is made by comparison of the current date/time of the image forming device and the date of creation of a license file.

FIG. 28 is a diagram for explaining determination of execution of activation which is made by comparison of the current date/time of the image forming device 100 and the date of creation of the license file 76.

As illustrated in FIG. 28, if the user operates the operation panel 24 to start the activation, the license file access part 82 reads out a date of creation of the license file 76 (1. Reference).

Next, the date/time comparing part 81 compares the current date/time of the system clock with the date of creation of the license file 76 (2. Reference & Comparison). If it is clearly detected that the current date/time of the system clock of the image forming device 100 precedes the date of creation of the license file 76, the date/time comparing part 81 notifies the activation control part 84 of the result of the detection. Thereby, the date/time comparing part 81 requests the activation control part 84 to inhibit the activation from being performed.

The detection of the system clock may be performed in order to allow some fluctuations of the system clock of the image forming device 100. When the fluctuations of the system clock fall within the allowable range, the activation may be permitted. Otherwise, if the current date of the system clock of the image forming device 100 is earlier than the date of creation of the license file 76 by three or more days, the activation is inhibited from being performed.

The date/time comparing part 81 transmits a message indicating that the system clock of the image forming device 100 should be corrected, to the user who has requested the activation.

In this embodiment, it is possible to prevent the illegal use of the plug-in component 73 when the system clock of the image forming device 100 is altered intentionally.

Next, another embodiment of the invention will be described. In this embodiment, at the time of deactivation of a sales package, the license unique ID of the sales package is prevented from being used in other sales packages (ID permanence). Thereby, the image forming device 100 of this embodiment prevents the illegal use of the plug-in component 73 by the illegal copy of the license file 76.

As described above, the license unique ID is unique to the license file 76. If the license unique ID is continuously available after the deactivation is performed, there is a possibility that the sales package for which the expiration date is exceeded may be illegally activated again without setting a new expiration date.

In this embodiment, an ID permanence process to allow a same license unique ID to be used only once is performed, in order to inhibit the activation using the old license unique ID after the expiration date. It is possible for this embodiment to prevent the re-activation of the sales package using an illegally copied license file 76 after the expiration date is exceeded. In the following, the term "ID permanence" means keeping the license unique ID unique.

Figure 29:
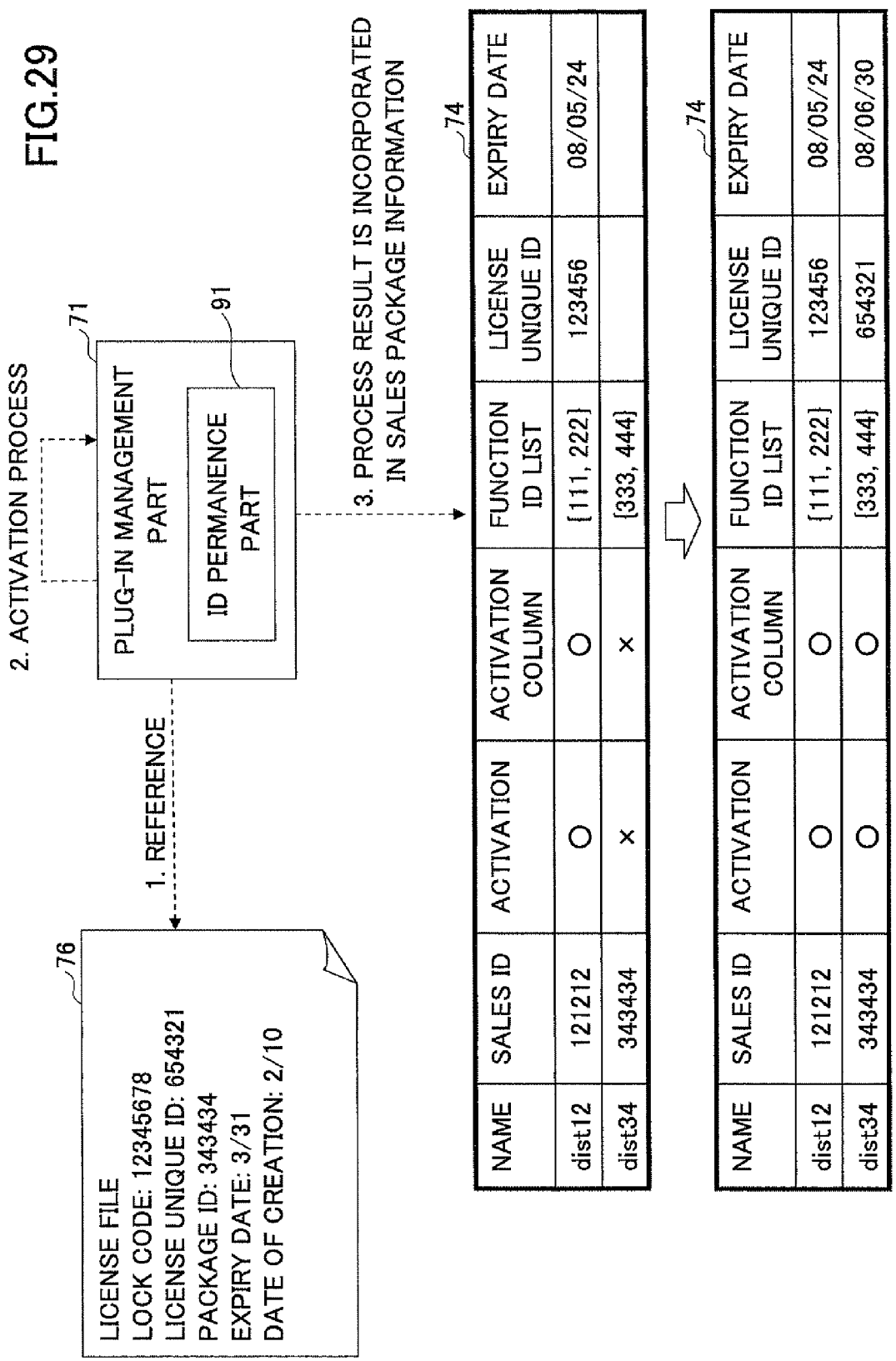
FIG. 29 is a diagram illustrating an example of sales package information before and after activation of a sales package is performed.
Figure 30:
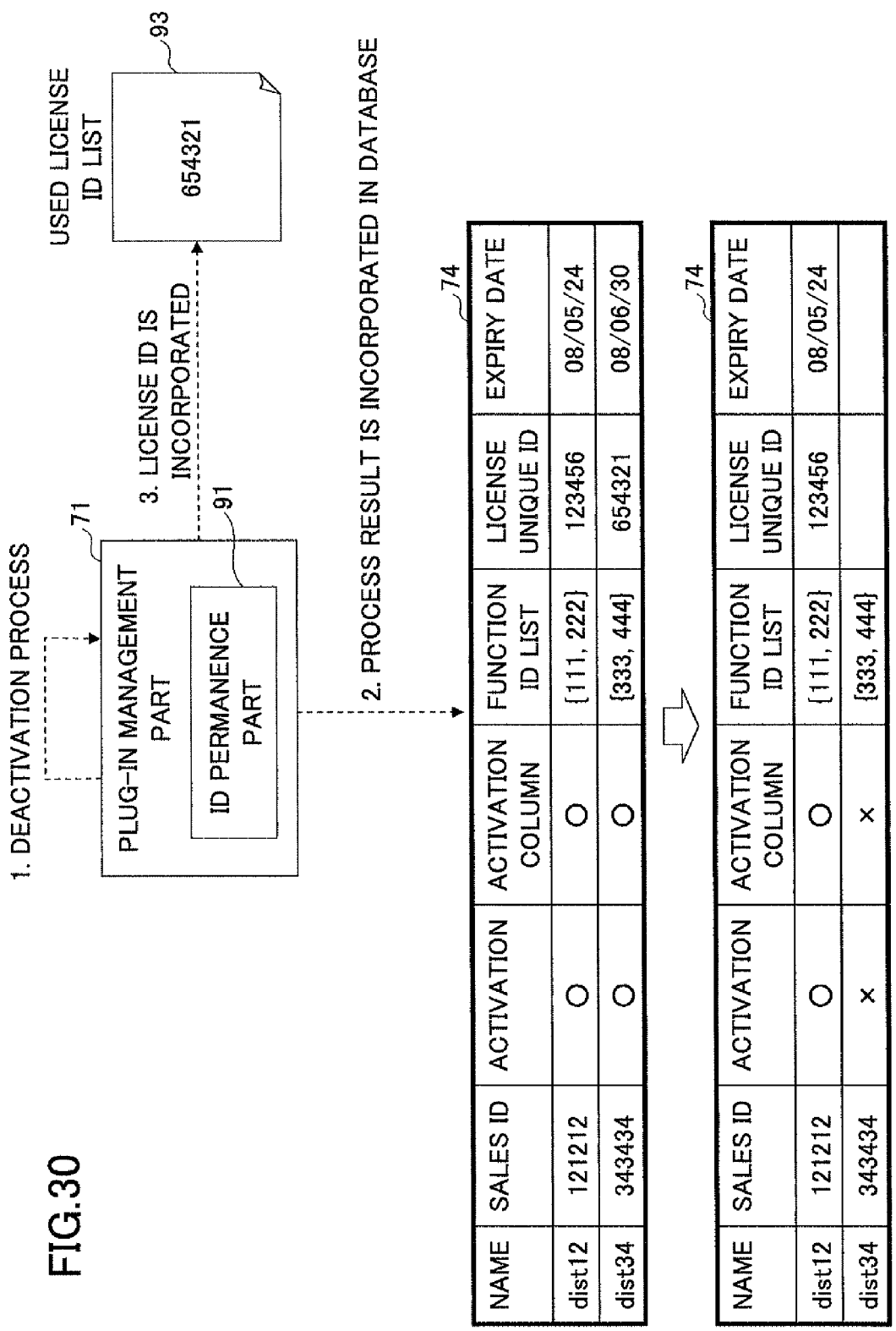
FIG. 30 is a diagram illustrating an example of sales package information before and after deactivation of a sales package is performed.
Figure 31:
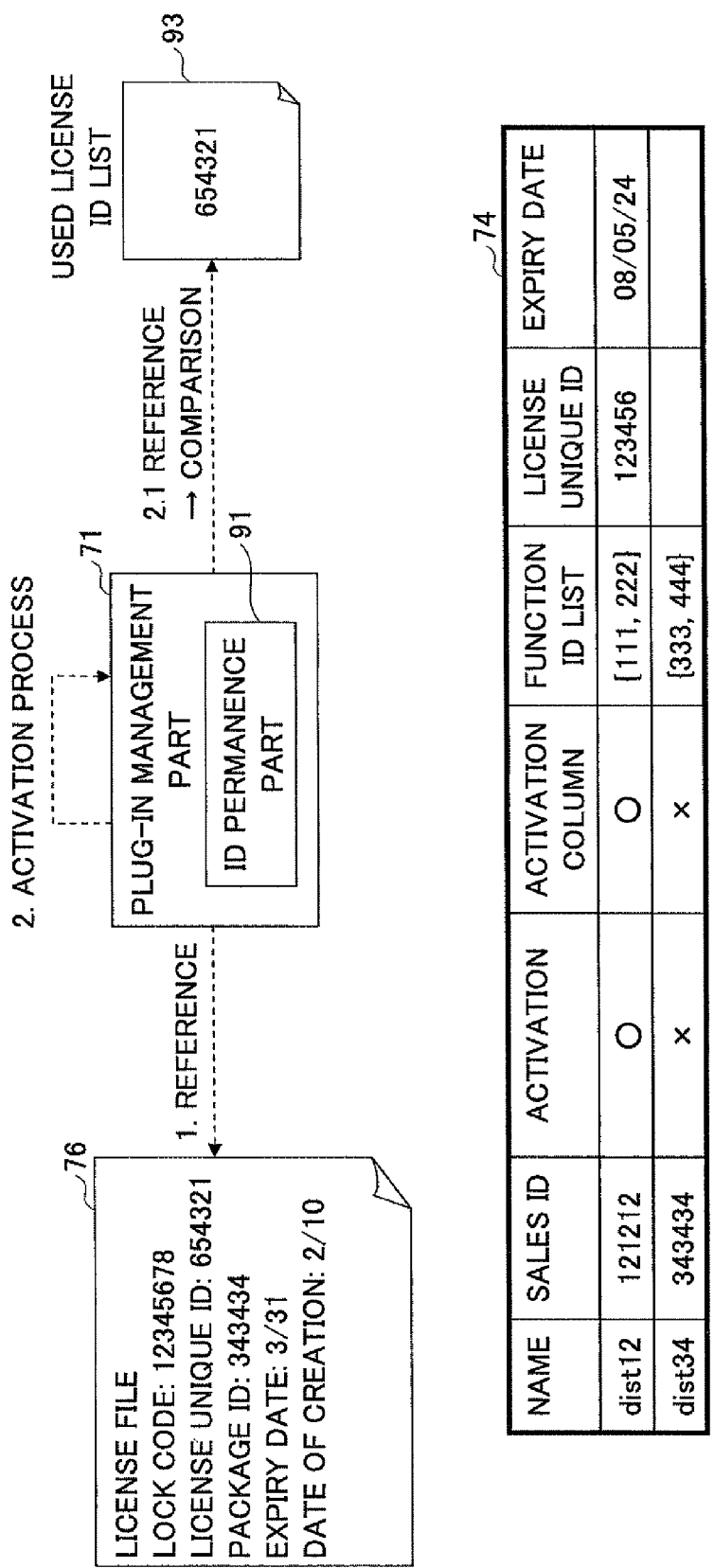
FIG. 31 is a diagram illustrating an example of sales package information before and after activation of a sales package which is the same as the deactivated one is performed.

FIGS. 29-31 are diagrams for explaining an example of the ID permanence of a license unique ID. FIG. 29 illustrates an example of the sales package information 74 before and after activation of a sales package is performed.

In this embodiment, the column "license unique ID" is provided in the sales package information 74.

As illustrated in FIG. 29, the ID permanence part 91 reads out a license unique ID from the license file 76 received from the license server 200 (1. Reference).

Next, the activation control part 84 performs the activation process of a sales package (2. Activation Process).

Next, the sales P information updating part 86 registers the license unique ID into the sales package information 74 (3. Process Result Is Incorporated).

In the case where the activation of the sales package of sales ID "343434" is newly performed, if a license unique ID of the same sales package generated by the license server 200 is "654321", the ID permanence part 91 registers "654321" into the column "license unique ID" of the sales package in the sales package information 74.

FIG. 30 illustrates an example of the sales package information 74 before and after deactivation of a sales package is performed.

As illustrated in FIG. 30, the activation control part 84 performs the deactivation process of a sales package (1. Deactivation Process).

Next, the sales P information updating part 86 deletes a corresponding license unique ID of the sales package from the sales package information 74 (2. Process Result Is Incorporated).

At the time of the deactivation, the ID permanence part 91 registers the license unique ID of the sales package the deactivation process of which is performed into a used license ID list 93 (3. License ID Is Incorporated). The used license ID list 93 is stored in the HDD 15.

In the example of FIG. 30, when the sales package of sales ID "343434" is deactivated, the ID permanence part 91 stores the license unique ID "654321" of the sales package into the used license ID list 93. Other processing steps at the time of the deactivation are performed as described above in the previous embodiment.

FIG. 31 illustrates an example of the sales package information 74 before and after activation of a sales package which is the same as the deactivated one is performed.

At the time of this activation, the user does not request the license server 200 to generate a license file 76 and attempts to use the already generated license file 76 to perform the activation of the sales package.

As illustrated in FIG. 31, the ID permanence part 91 reads out a license unique ID from the license file 76 (1. Reference).

Next, the activation control part 84 starts performing the activation process of the sales package (2. Activation Process). At this time, however, the ID permanence part 91 compares the license unique ID read from the license file 76 with the license unique ID read from the used license ID list 93, and detects whether the license unique ID from the license file 76 is already registered in the used license ID list 93 (2.1 Reference→Comparison).

When it is registered, the ID permanence part 91 notifies the activation control part 84 that the license unique ID is illegally used. Thereby, the activation control part 84 stops performing the activation process of the sales package.

For example, when the license server 200 transmits the old license unique ID "654321" to the image forming device 100, the ID permanence part 91 detects that the old license unique ID "654321" is already registered in the used license ID list 93. the ID permanence part 91 stops activation. Hence, it is possible to prevent the illegal activation of a sales package from being performed using the same license file 76.

Figure 32:
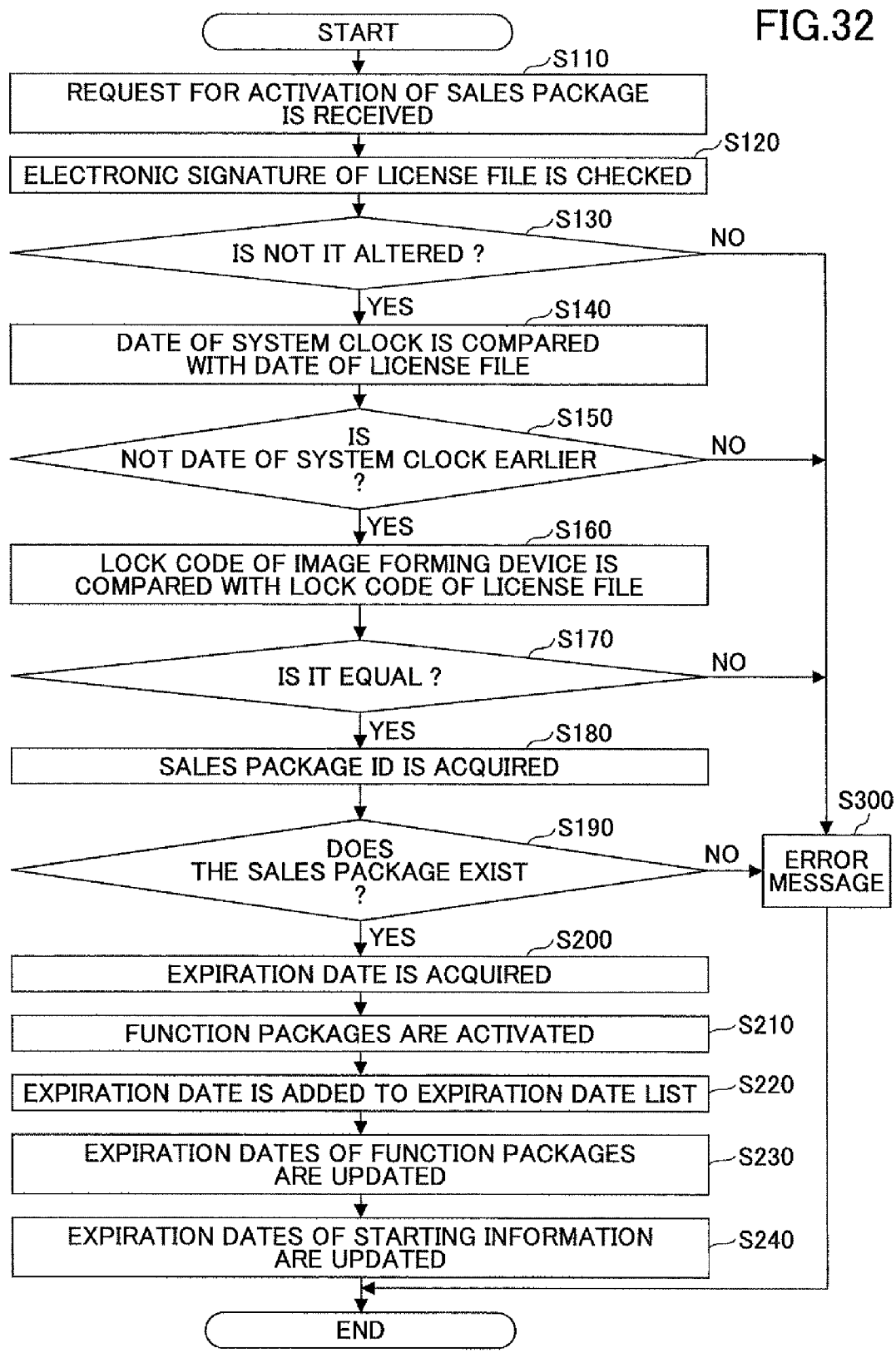
FIG. 32 is a flowchart for explaining an activation process performed by the image forming device of an embodiment of the invention.

FIG. 32 is a flowchart for explaining an activation process performed by the plug-in management part 71 of the image forming device of an embodiment of the invention. Execution of the process of FIG. 32 is started at the time an activation operation is requested by the user or installation of a sales package is performed.

First, the plug-in management part 71 receives (or detects) a request for activation of a sales package (S110).

Subsequently, the license file access part 82 checks the electronic signature of the license file 76 which is stored in the image forming device 100 (S120).

As a result of the checking (S130), when the electronic signature is altered, the plug-in management part 71 displays an error message, indicating the alteration of the electronic signature, on the display part 25 (S300). Next, the activation process is terminated.

When the electronic signature is not altered (Yes in S130), the date/time comparing part 81 compares the date of the system clock of the image forming device 100 with the date of creation of the license file 76, and determines whether the date of the system clock is not earlier than the date of creation of the license file 76 by a predetermined period (S140).

As a result of the determination, when the date of the system clock is earlier than the date of creation of the license file 76 (No in S150), the plug-in management part 71 displays an error message, indicating the alteration of the system clock, on the display part 25 (S300). Next, the activation process is terminated.

When the date of the system clock is not earlier than the date of creation of the license file 76 (Yes in S150), the license file access part 82 compares the lock code stored in the license file 76 with the lock code of the image forming device 100 (S160).

As a result of the comparison, when the two lock codes are not equal (No in S170), the plug-in management part 71 displays an error message, indicating the alteration of the lock code, on the display part 25 (S300). Next, the activation process is terminated.

When the two lock codes are equal (Yes in S170), the activation control part 84 specifies the sales package by reading the sales package ID which is the target of the activation from the license file 76 (S180). Next, the activation control part 84 determines whether the sales package is installed in the image forming device 100 (S190).

When the sales package is not installed (No in S190), the plug-in management part 71 displays an error message on the display part 25 (S300). Next, the activation process is terminated.

Subsequently, the sales P information updating part 86 sets an expiration date of the sales package read from the license file 76, into the sales package information 74 (S200).

The function P information updating part 87 activates the function packages included in the sales package (S210). The states of the function packages which are included in the sales package and already activated are not changed. Next, the function P information updating part 87 adds an expiration date to the expiration date list of each of the function packages included in the sales package (S220).

The starting information updating part 92 specifies an expiration date of each function package based on the updated expiration date list (S230). Next, the expiration date of the starting information 77 is updated (S240).

The image forming device 100 of this embodiment can perform activation of each sales package, and thereby activate the plurality of plug-in components 73 which can be effectively used as a result of association of some of functions provided by the plurality of programs of the sales package.

As described in the foregoing, the image forming device of one embodiment of the invention can perform activation of a plurality of programs on a package-by-package basis and can easily set up the activation or deactivation of each program.

The present invention is not limited to the specifically disclosed embodiments, and variations and modifications may be made without departing from the scope of the present invention.

The present application is based on Japanese patent application No. 2008-171636, filed on Jun. 30, 2008, the contents of which are incorporated herein by reference in their entirety.

What is claimed is:

1. An image forming device which starts one or more program components contained in a sales package and registered in starting information at a time of activation of the sales package, comprising:
   an information storage part to store sales package information in which a first flag indicating an activated or deactivated state of a sales package, and a component identifier of each of one or more program components contained in the sales package are registered, and to store function package information in which an activation component number indicating the number of program components activated by the activation among purchased program components, and a second flag indicating an activated or deactivated state of each of the one or more program components are registered;
   a function package information updating part to increment, when activation of the sales package is performed, the activation component number of each of the one or more program components registered in the function package information, and to set the second flag of one of the one or more program components to an activated state when the second flag of said one of the one or more program components prior to the activation indicates a deactivated state; and
   a starting information updating part to register a component identifier of one of the one or more program components into the starting information when the second flag of said one of the one or more program components is changed from the deactivated state to the activated state by the activation.

2. The image forming device according to claim 1, further comprising:
   a sales package information updating part to register into the sales package information an expiration date of one of the one or more program, components contained in the sales package;
   a time limit management part to detect expiration of the expiration date; and
   an activation control part to deactivate the sales package when the time limit management part detects expiration of the expiration date.

3. The image forming device according to claim 2, further comprising a starting part to start the one or more program components registered in the starting information,
   wherein, when the expiration date is registered into the sales package information, the function package information updating part updates an expiration date list, which is registered in the function package information for each program component, by adding the registered expiration date in the sales package information, and
   wherein the starting information updating part registers, for each program component, a latest expiration date among expiration dates of the expiration date list into the starting information, and the starting part does not start a corresponding program component when a current date exceeds the latest expiration date registered in the starting information.

4. The image forming device according to claim 3, wherein, when an item indicating that no expiration date is set is included in the expiration date list of a program component, the starting information updating part sets the item to an expiration date of the program component in the starting information.

5. The image forming device according to claim 2, wherein, when a license unique identifier which uniquely identifies the image forming device is registered at a time of purchase of the sales package into license information which certifies a use license of the sales package, the activation control part allows activation of the sales package to be performed, when the license unique identifier registered in the license information matches with a license unique identifier stored beforehand in the image forming device.

6. The image forming device according to claim 5, wherein, when a predetermined expiration date indicating a time limit for specifying a use license of the sales package is registered in the license information, the sales package information updating part reads the predetermined expiration date from the license information when activation of the sales package is performed, and registers the predetermined expiration date into the sales package information.

7. The image forming device according to claim 5, wherein, when a validity period in which a use license of the sales package is specified is registered in the license information, the sales package information updating part registers into the sales package information an expiration date which is computed by adding the validity period to a current date indicated by a system clock of the image forming device.

8. The image forming device according to claim 5, wherein a date of creation of the license information is registered in the license information, the image forming device further comprising a date comparing unit to compare a current date indicated by a system clock of the image forming device with the date of creation of the license information, and when the date comparing part detects that the current date is earlier than the date of creation, the activation' control part inhibits activation of the sales package from being performed.

9. The image forming device according to claim 5, wherein a license unique ID of the sales package which uniquely identifies the license information is registered in the license information, and when the sales package is deactivated, the license unique ID of the sales package is stored in an ID list storage part, the image forming device further comprising an ID permanence unit to detect, when activation of the sales package is performed, whether the license unique ID registered in the license information is stored in the ID list storage part, and
wherein the activation control part inhibits the activation when the license unique ID registered in the license information is detected as being stored in the ID list storage part.

10. The image forming device according to claim 2, wherein a reminding date which is computed by subtracting a predetermined remaining activation period from the expiration date of the sales package information is stored, the image forming device further comprising an expiration date reminding part to notify, when a current date indicated by a system clock of the image forming device reaches the reminding date, a user that the use license of the sales package expires at an end of the remaining activation period or on the expiration date.

11. The image forming device according to claim 1, wherein, when the sales package is deactivated, the function package information updating part decrements the activation component number of each of the one or more program components registered in the function package information, and, when the activation component number of one of the one or more program components is equal to zero as a result of the decrementing, the function package information updating part sets the second flag of said one of the one or more program components to the deactivated state.

12. An activation method of an image forming device which starts one or more program components contained in a sales package and registered in starting information at a time of activation of the sales package and includes an information storage part which stores sales package information in which a first flag indicating an activated or deactivated state of a sales package, and a component identifier of each of one or more program components contained in the sales package are registered, and stores function package information in which an activation component number indicating the number of program components activated by the activation among purchased program components, and a second flag indicating an activated or deactivated state of each of the one or more program components are registered, the activation method comprising:
incrementing, by a function package information updating part of the image forming device, when activation of the sales package is performed, the activation component number of each of the one or more program components registered in the function package information, and setting the second flag of one of the one or more program components to an, activated state when the second flag of said one of the one or more program components prior to the activation indicates a deactivated state; and
registering, by a starting information updating part of the image forming device, a component identifier of one of the one or more program components into the starting information when the second flag of said one of the one or more program components is changed from the deactivated state to the activated state by the activation.

13. A non-transitory computer-readable recording medium storing a program which, when executed by a computer, causes the computer to perform an activation method of an image forming device which starts one or more program components contained in a sales package and registered in starting information at a time of activation of the sales package and includes an information storage part which stores sales package information in which a first flag indicating an activated or deactivated state of a sales package, and a component identifier of each of one or more program components contained in the sales package are registered, and stores function package information in which an activation component number indicating the number of program components activated by the activation among purchased program components, and a second flag indicating an activated or deactivated state of each of the one or more program components are registered, the activation method comprising:
incrementing, by a function package information updating part of the image forming device, when activation of the sales package is performed, the activation component number of each of the one or more program components registered in the function package information, and setting the second flag of one of the one or more program components to an activated state when the second flag of said one of the one or more program components prior to the activation indicates a deactivated state; and
registering, by a starting information updating part of the image forming device, a component identifier of one of the one or more program components into the starting information when the second flag of said one of the one or more program components is changed from the deactivated state to the activated state by the activation.

* * * * *

UNITED STATES PATENT AND TRADEMARK OFFICE
CERTIFICATE OF CORRECTION

PATENT NO. : 8,363,252 B2
APPLICATION NO. : 12/490426
DATED : January 29, 2013
INVENTOR(S) : Shunichi Maeda Page 1 of 1

It is certified that error appears in the above-identified patent and that said Letters Patent is hereby corrected as shown below:

On the Title Page, Item (54) and in the specification, Column 1, line 1: Title should read:

IMAGE FORMING DEVICE AND ACTIVATION METHOD ACTIVATING OR DEACTIVATING PROGRAM ON PACKAGE BASIS

Signed and Sealed this
Twenty-eighth Day of May, 2013

Teresa Stanek Rea
*Acting Director of the United States Patent and Trademark Office*